US012682523B2

(12) United States Patent
Yamada et al.

(10) Patent No.: US 12,682,523 B2
(45) Date of Patent: Jul. 14, 2026

(54) DISPLAY APPARATUS, CONTROL METHOD FOR DISPLAY APPARATUS AND NON-TRANSITORY COMPUTER-READABLE STORAGE MEDIUM

(71) Applicant: SEIKO EPSON CORPORATION, Tokyo (JP)

(72) Inventors: Yusuke Yamada, Shiojiri (JP); Masahiro Maeda, Matsumoto (JP); Naoto Kuroda, Ina (JP)

(73) Assignee: Seiko Epson Corporation, Tokyo (JP)

( * ) Notice: Subject to any disclaimer, the term of this patent is extended or adjusted under 35 U.S.C. 154(b) by 141 days.

(21) Appl. No.: 18/493,727

(22) Filed: Oct. 24, 2023

(65) Prior Publication Data

US 2024/0134500 A1    Apr. 25, 2024
US 2024/0231568 A9    Jul. 11, 2024

(30) Foreign Application Priority Data

Oct. 25, 2022    (JP) .................................. 2022-170425

(51) Int. Cl.
    *G06F 3/048*       (2013.01)
    *G06F 3/04817*    (2022.01)
          (Continued)

(52) U.S. Cl.
    CPC ........ *G06F 3/0483* (2013.01); *G06F 3/04817* (2013.01); *G06F 3/0482* (2013.01);
          (Continued)

(58) Field of Classification Search
    CPC ............... G06F 3/0483; G06F 3/04817; G06F 3/04845; G06F 3/0482; G06F 2203/04804; G06T 11/203; G06T 2200/24
    See application file for complete search history.

(56) References Cited

U.S. PATENT DOCUMENTS 6,466,237 B1 * 10/2002   Miyao ..................... G06F 16/54
                                      715/848
8,584,043 B2 * 11/2013   Cho ....................... G06F 3/0488
                                      715/814

(Continued)

FOREIGN PATENT DOCUMENTS

JP      2008-146245 A     6/2008
JP      2012-208853 A    10/2012
             (Continued)

*Primary Examiner* — Linh K Pham

(74) *Attorney, Agent, or Firm* — WORKMAN NYDEGGER

(57) ABSTRACT

A display apparatus includes a touch panel functioning as a receiving unit receiving an operation and a display section, and a control section controlling the display section to display a display window including a first display area for displaying a bundle of images of reduced images of respective pages contained in a document file and a second display area for displaying a page image of part of the pages contained in the document file, when an instruction to add a page is received by the touch panel, the control section displays a page image of an added additional page in the second display area and displays a bundle of thumbnail images containing a reduced image of the page image of the additional page in the first display area.

9 Claims, 20 Drawing Sheets

(51) Int. Cl.

| | | |
|---|---|---|
| *G06F 3/0482* | (2013.01) | |
| *G06F 3/0483* | (2013.01) | |
| *G06F 3/04845* | (2022.01) | |
| *G06T 11/23* | (2026.01) | |
| *G06T 11/60* | (2006.01) | |

(52) U.S. Cl.

CPC .......... *G06F 3/04845* (2013.01); *G06T 11/23* (2026.01); *G06T 11/60* (2013.01); *G06F 2203/04804* (2013.01); *G06T 2200/24* (2013.01)

(56) References Cited

U.S. PATENT DOCUMENTS

| | | | | |
|---|---|---|---|---|
| 8,966,396 B2 * | 2/2015 | Hart | ...................... | G06F 3/0481 |
| | | | | 715/810 |
| 11,204,687 B2 * | 12/2021 | Cueto | .................. | G06F 3/0488 |

| | | | | |
|---|---|---|---|---|
| 2012/0159364 A1 * | 6/2012 | Hyun | .................. | G06F 3/04815 |
| | | | | 715/848 |
| 2012/0200594 A1 * | 8/2012 | Yamada | ................. | G09G 1/285 |
| | | | | 345/619 |
| 2014/0250391 A1 * | 9/2014 | Jong | .................... | G06F 3/0483 |
| | | | | 715/778 |
| 2020/0210033 A1 * | 7/2020 | Yamada | ............. | G06F 3/04845 |
| 2020/0358896 A1 * | 11/2020 | Kwon | ....................... | G06F 3/14 |
| 2021/0027749 A1 * | 1/2021 | Ishikura | ................. | G09G 5/363 |
| 2021/0081596 A1 | 3/2021 | Nakamura | | |
| 2022/0342520 A1 * | 10/2022 | Yamada | ................ | G06F 3/0488 |

FOREIGN PATENT DOCUMENTS

| | | | | | |
|---|---|---|---|---|---|
| JP | 5772202 B2 * | 9/2015 | ............. | | G09G 3/344 |
| JP | 2021-015470 A | 2/2021 | | | |
| JP | 2021047639 | 3/2021 | | | |

* cited by examiner

*FIG. 8*

DISPLAY APPARATUS, CONTROL METHOD FOR DISPLAY APPARATUS AND NON-TRANSITORY COMPUTER-READABLE STORAGE MEDIUM

The present application is based on, and claims priority from JP Application Serial Number 2022-170425, filed Oct. 25, 2022, the disclosure of which is hereby incorporated by reference herein in its entirety.

BACKGROUND

1. Technical Field

The present disclosure relates to a display apparatus, a control method for a display apparatus, and a non-transitory computer-readable storage medium.

2. Related Art

In related art, an apparatus displaying a plurality of thumbnail images arranged in a predetermined order in a list on a display surface and, when a desired thumbnail image is touched and selected, displaying a menu icon correlated with the desired thumbnail image is known.

For example, in JP-A-2021-15470, in a bundle of images including a plurality of thumbnail images, when a thumbnail image or the bundle of images are selected, a menu icon correlated with the selected thumbnail image or bundle of images in a position not overlapping with the bundle of images.

When a document file is viewed, there is a need for adding a page or adding a captured image to a selected page of the document file. However, in the document file, checking of a position where the page is added is not easy and increase in convenience is requested.

SUMMARY

The present disclosure is a display apparatus including a receiving unit receiving an operation, a display section, and a control section controlling the display section to display a display window including a first display area for displaying a bundle of images of reduced images of respective pages contained in a document file and a second display area for displaying a page image of part of the pages contained in the document file, wherein, when an instruction to add a page is received by the receiving unit, the control section displays a page image of an added additional page in the second display area and displays the bundle of images containing a reduced image of the page image of the additional page in the first display area.

The present disclosure is a display apparatus including a receiving unit receiving an operation, a display section, and a control section controlling the display section to display a display window including a first display area for displaying a bundle of images of reduced images of respective pages contained in a document file and a second display area for displaying a page image of part of the pages contained in the document file, wherein, when an instruction to add a page is received by the receiving unit, the control section generates a reduced page image formed by reduction of a page image of an added additional page, superimposes and displays the reduced page image on a page image of a page selected by the operation received by the receiving unit in the second display area, and displays the bundle of images of the reduced images of the page image on which the reduced page image is superimposed in the first display area.

The present disclosure is a control method for a display apparatus including controlling a display section to display a display window including a first display area for displaying a bundle of images of reduced images of respective pages contained in a document file and a second display area for displaying a page image of part of the pages contained in the document file, when receiving an instruction to add a page, displaying a page image of an added additional page in the second display area, and displaying the bundle of images containing a reduced image of the page image of the additional page in the first display area.

The present disclosure is a non-transitory computer-readable storage medium storing a program for controlling a computer to execute a procedure of controlling a display section to display a display window including a first display area for displaying a bundle of images of reduced images of respective pages contained in a document file and a second display area for displaying a page image of part of the pages contained in the document file, a procedure of, when receiving an instruction to add a page, displaying a page image of an added additional page in the second display area, and a procedure of displaying the bundle of images containing a reduced image of the page image of the additional page in the first display area.

BRIEF DESCRIPTION OF THE DRAWINGS

FIG. 8 shows an example of a view window.

DESCRIPTION OF EMBODIMENTS

As below, embodiments will be explained with reference to the accompanying drawings.

Figure 1:
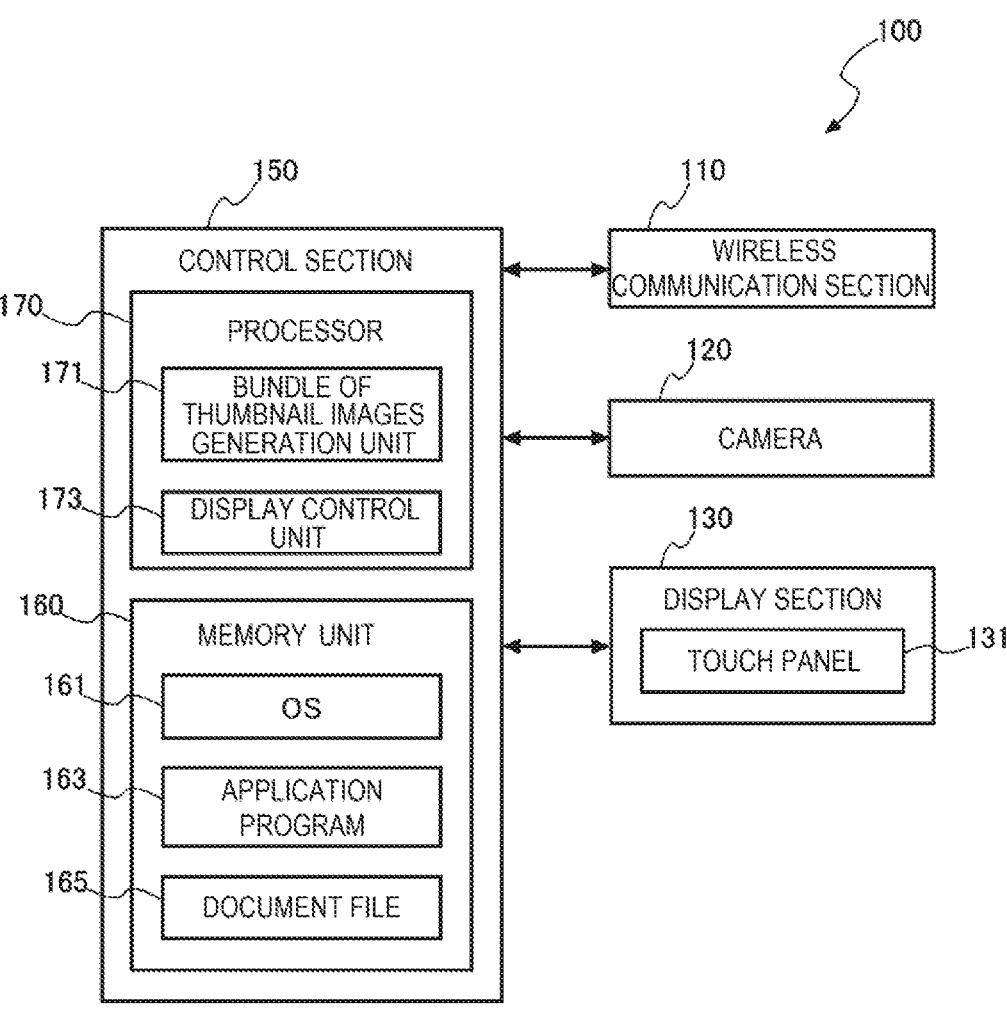
FIG. 1 shows a configuration of a display apparatus.

FIG. 1 shows a configuration of a display apparatus 100.

The configuration of the display apparatus 100 will be explained with reference to FIG. 1.

The display apparatus 100 includes a wireless communication section 110, a camera 120, a display section 130, and a control section 150. For the display apparatus 100, e.g., a notebook, desktop, or tablet personal computer, a smartphone, or the like is used.

The wireless communication section 110 includes a wireless module and an antenna and communicates with an external apparatus such as a server apparatus via a wireless network.

The camera 120 is a digital camera using a solid-state imaging device e.g., a CCD (Charge Coupled Device), a CMOS (Complementary Metal Oxide Semiconductor), or the like.

The display section 130 has a touch panel 131 including a display panel and a touch sensor. For the display panel, e.g., a liquid crystal panel or an organic EL (Electro Luminescence) panel is used. The touch sensor detects a touch operation on the display panel. The touch sensor detects a touch position as a position of the touch panel 131 where a pointer such as an electronic pen or a finger of a user contacts as a touch operation. The touch sensor outputs an operation signal containing the detected touch position to the control section 150. The touch position is expressed by coordinates in a coordinate system set for the display panel. The touch panel 131 corresponds to a receiving unit.

The control section 150 includes a memory unit 160 and a processor 170.

The memory unit 160 includes a volatile semiconductor memory such as a RAM (Random Access Memory) and a non-volatile semiconductor memory such as a ROM (Read Only Memory). Further, for example, when the display apparatus 100 is a smartphone, an SD card may be provided as the memory unit 160. Or, when the display apparatus 100 is a personal computer, an auxiliary storage device such as an SSD (Solid State Drive) or an HDD (Hard Disk Drive) may be provided.

The memory unit 160 stores an OS (Operating System) 161 and an application program 163 executed by the processor 170. Hereinafter, the application program 163 will be referred to as "app 163".

Further, the memory unit 160 stores a document file 165. The document file 165 includes e.g., an electronic manual, an electronic book, a document created by a user, etc. The document file 165 may be a file generated by the user executing the app 163 or a file acquired from an external apparatus by the wireless communication section 110.

The processor 170 includes a CPU (Central Processing Unit). Further, the control section 150 may include a CPU, a GPU (Graphics Processing Unit), a communication interface, and an SoC (System-on-a-Chip) on which various sensors etc. are mounted.

The processor 170 controls various sections of the display apparatus 100 by executing the OS 161 and the app 163.

The control section 150 includes a bundle of thumbnail images generation unit 171 and a display control unit 173 as functional blocks. These functional blocks conveniently show the functions realized by the processor 170 executing the OS 161 and the app 163 using blocks.

Figure 2:
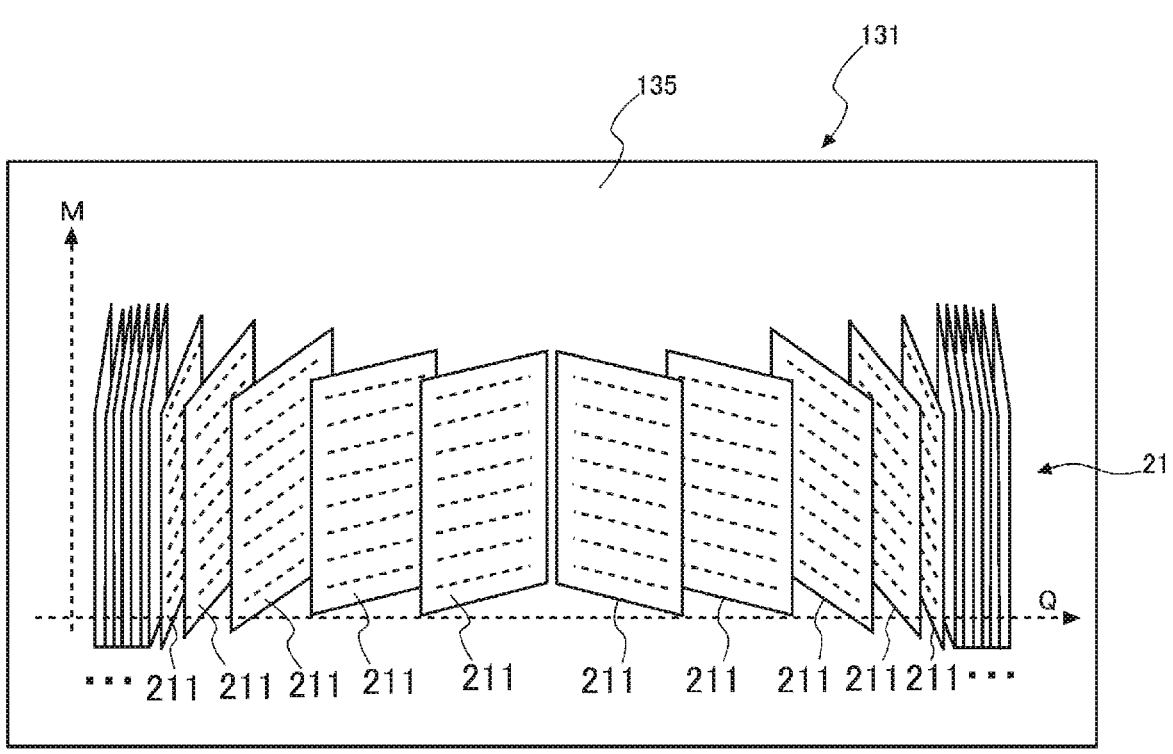
FIG. 2 shows an example of a bundle of thumbnail images.

FIG. 2 shows an example of a bundle of thumbnail images 21.

The bundle of thumbnail images generation unit 171 reads out the document file 165 from the memory unit 160 and generates thumbnail images 211 by reducing page images 25 as images of respective pages contained in the read out document file 165. The bundle of thumbnail images generation unit 171 generates an overhead view image as an overview of the bundle of thumbnail images 21 based on the bundle of thumbnail images 21 as a bundle of the generated plurality of thumbnail images 211. The overhead view image is an image visually recognized by an observer when the observer views the bundle of thumbnail images 21 placed within a virtual space from an arbitrary viewpoint within the virtual space.

The bundle of thumbnail images generation unit 171 arranges the plurality of thumbnail images 211 in a direction of a first virtual axis Q parallel to the lateral direction of a display surface 135 of the touch panel 131. The plurality of thumbnail images 211 may be moved along the first virtual axis Q in response to an operation by the user. Further, the bundle of thumbnail images generation unit 171 rotates the plurality of thumbnail images 211 around a second virtual axis M parallel to the longitudinal direction of the display surface 135 and crossing the first virtual axis Q. Furthermore, the bundle of thumbnail images generation unit 171 generates the overhead view image of the bundle of thumbnail images 21 by rotating the thumbnail images around the second virtual axis M.

Here, a method of generating the overhead view image of the bundle of thumbnail images 21 with reference to FIGS. 3 to 6.

Figure 3:
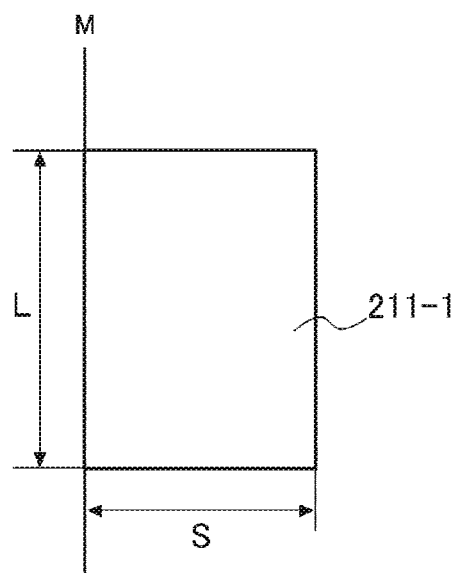
FIG. 3 is a diagram for explanation of a method of generating an overhead view image of the bundle of thumbnail images.
Figure 4:
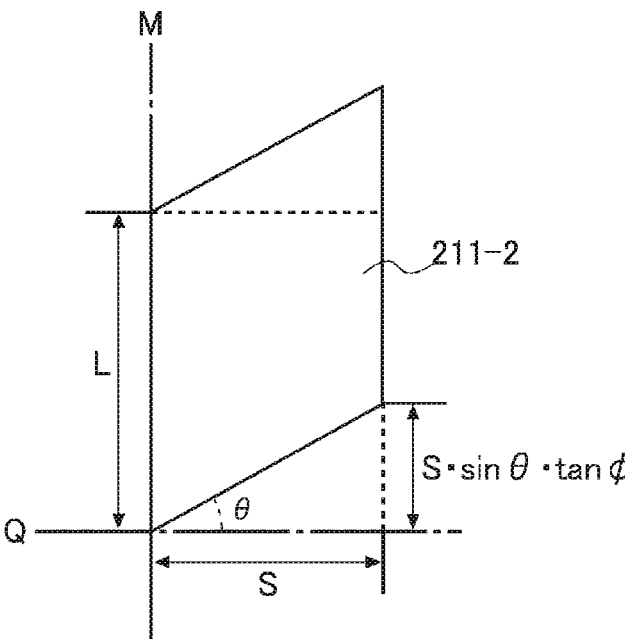
FIG. 4 is a diagram for explanation of the method of generating the overhead view image of the bundle of thumbnail images.

First, the bundle of thumbnail images generation unit 171 deforms a thumbnail image 211-1 as the thumbnail image 211-1 shown in FIG. 3 seen from front in the longitudinal direction without changing the lateral width as shown in FIG. 4. Thereby, as shown in FIG. 4, a thumbnail image 211-2 formed by shifting of the right side of the thumbnail image 211-1 by $S \cdot \sin \theta \cdot \tan \phi$ relative to the left side is generated. The illustration of an angle $\phi$ is omitted.

Figure 5:
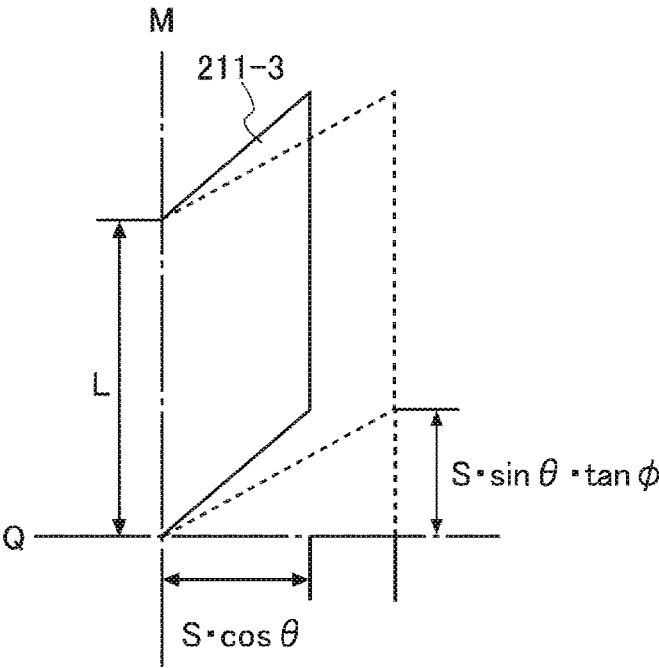
FIG. 5 is a diagram for explanation of the method of generating the overhead view image of the bundle of thumbnail images.

Then, as shown in FIG. 5, the bundle of thumbnail images generation unit 171 generates a thumbnail image 211-3 by reducing the thumbnail image 211-2 in the lateral direction by a factor of $\cos \theta$. As a result, the lateral width of the thumbnail image 211-3 is $S \cdot \cos \theta$.

Figure 6:
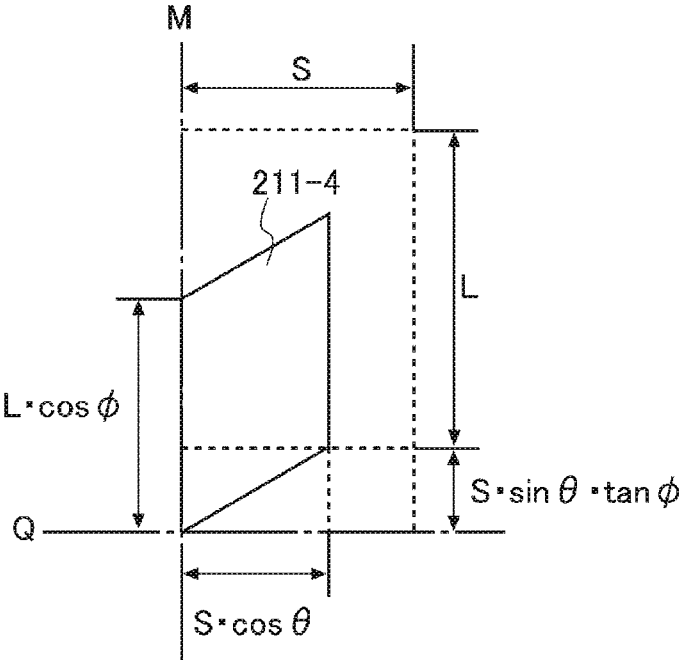
FIG. 6 is a diagram for explanation of the method of generating the overhead view image of the bundle of thumbnail images.

Finally, as shown in FIG. 6, the bundle of thumbnail images generation unit 171 generates a thumbnail image 211-4 by reducing the thumbnail image 211-3 in the longitudinal direction by the factor of $\cos t$. As a result, the dimension of the thumbnail image 211-4 in the longitudinal direction is $L \cdot \cos \phi$. Thereby, the thumbnail image 211-4 formed by rotation of the thumbnail image 211-1 around the second virtual axis M by a rotation angle $\theta$ and further rotation around the first virtual axis Q is obtained. In other words, the thumbnail image 211-4 formed by rotation of the thumbnail image 211-1 around the second virtual axis M by the rotation angle $\theta$ and overlooking of the thumbnail image 211-1 at an angle of depression $\phi$ from the viewpoint above the upper side of the thumbnail image 211-1 is obtained.

The rotation angle $\theta$ is set to a preset rotation angle based on the position on the first virtual axis Q. That is, the rotation angle $\theta$ is set to be gradually larger as the position is farther from the center of the display surface 135.

The bundle of thumbnail images generation unit 171 similarly generates overhead view images with respect to first operation icons 300 and second operation icons 310, which will be described later, deformed as overhead views from diagonally above. The display forms of the first operation icons 300 and the second operation icons 310 are the same as those of the thumbnail images 21 and the detailed explanation will be omitted.

The display control unit 173 generates an app window 20 displayed on the display surface 135 of the touch panel 131 based on the bundle of thumbnail images 21 generated by the bundle of thumbnail images generation unit 171 and the page images 25. The app window 20 corresponds to a display window and contains a list window 20A and a view window 20B. In the list window 20A and the view window 20B, a home button 11 correlated with an operation to return to a home window and a back button 13 correlated with an operation to return to a previous window are respectively displayed. The back button 13 corresponds to a return button.

The app window 20 will be explained with reference to FIGS. 7 to 17.

In FIGS. 7 to 17, a direction upward in the drawings is shown by a sign UP as an upward direction, a direction downward in the drawings is shown by a sign DW as a downward direction, a direction leftward in the drawings is shown by a sign L as a leftward direction, a direction rightward in the drawings is shown by a sign R as a rightward direction.

Figure 7:
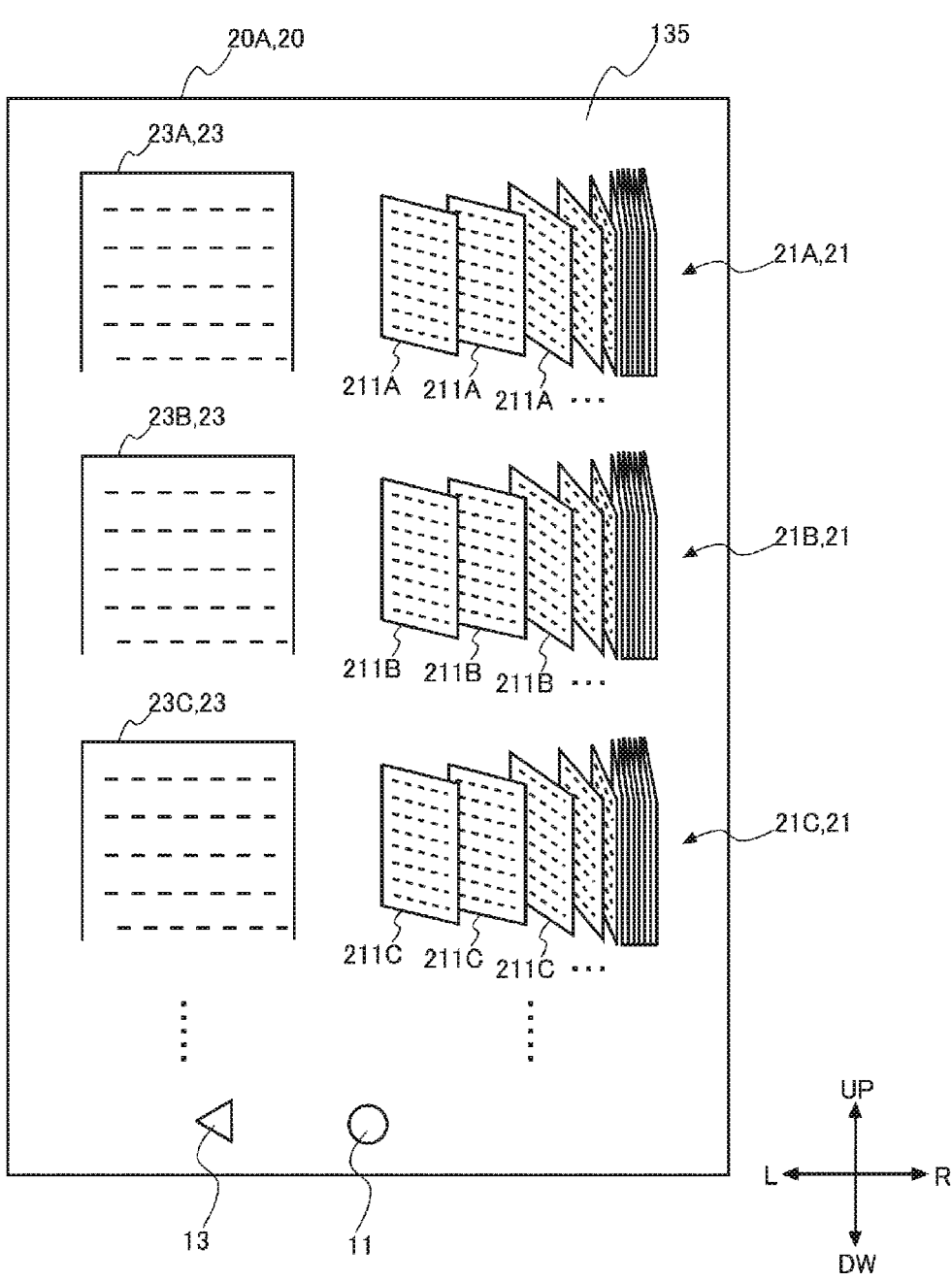
FIG. 7 shows an example of a list window.

FIG. 7 shows an example of the list window 20A.

The list window 20A is a window displaying a plurality of document files 165 selected by the user of the document files 165 stored in the memory unit 160 in a list. In the list window 20A, a combination of the bundle of thumbnail images 21 and a main thumbnail image 23 is displayed with respect to each document file 165. Here, the explanation is made on the assumption that the document files 165 of the document files 165A, 165B, 165C, . . . , 165N are stored in the memory unit 160. The bundle of thumbnail images 21 of the document file 165A are displayed as a bundle of thumbnail images 21A and the main thumbnail image 23 is displayed as a main thumbnail image 23A. The same applies to the documents 165B, . . . , 165N. N is an arbitrary natural number.

In the list window 20A, a combination of the bundle of thumbnail images 21A and the main thumbnail image 23A generated based on the document file 165A is displayed in a predetermined position.

Further, in the list window 20A, a combination of a bundle of thumbnail images 21B and a main thumbnail image 23B generated based on the document file 165B is displayed. The combination of the bundle of thumbnail images 21B and the main thumbnail image 23B is displayed under the combination of the bundle of thumbnail images 21A and the main thumbnail image 23A in a line.

Furthermore, in the list window 20A, a combination of a bundle of thumbnail images 21C and a main thumbnail image 23C generated based on the document file 165C is displayed. The combination of the bundle of thumbnail images 21C and the main thumbnail image 23C is displayed under the combination of the bundle of thumbnail images 21B and the main thumbnail image 23B in a line.

The bundle of thumbnail images 21 is a group of images in which the plurality of thumbnail images 211 are arranged in the leftward and rightward directions. The respective thumbnail images 211 contained in the bundle of thumbnail images 21 are displayed in an overhead view from a predetermined viewpoint. One thumbnail image 211 contained in the bundle of thumbnail images 21 corresponds one page of the corresponding document file 165. The thumbnail image 211 of the embodiment is a rectangular image.

The main thumbnail image 23 is a thumbnail image corresponding to a representative page of the document file 165. The representative page includes e.g., the top page of the document file 165. In the list window 20A, a part of the thumbnail image 211 on a predetermined page may be displayed as the main thumbnail image 23 or the entire of the thumbnail image 211 on a predetermined page may be displayed as the main thumbnail image 23.

In the list window 20A, a selection operation to select the combination of the bundle of thumbnail images 21 and the main thumbnail image 23 can be input by a touch operation. When the combination is selected in the list window 20A, the display control unit 173 displays the view window 20B relating to the selected document file 165.

Figure 8:
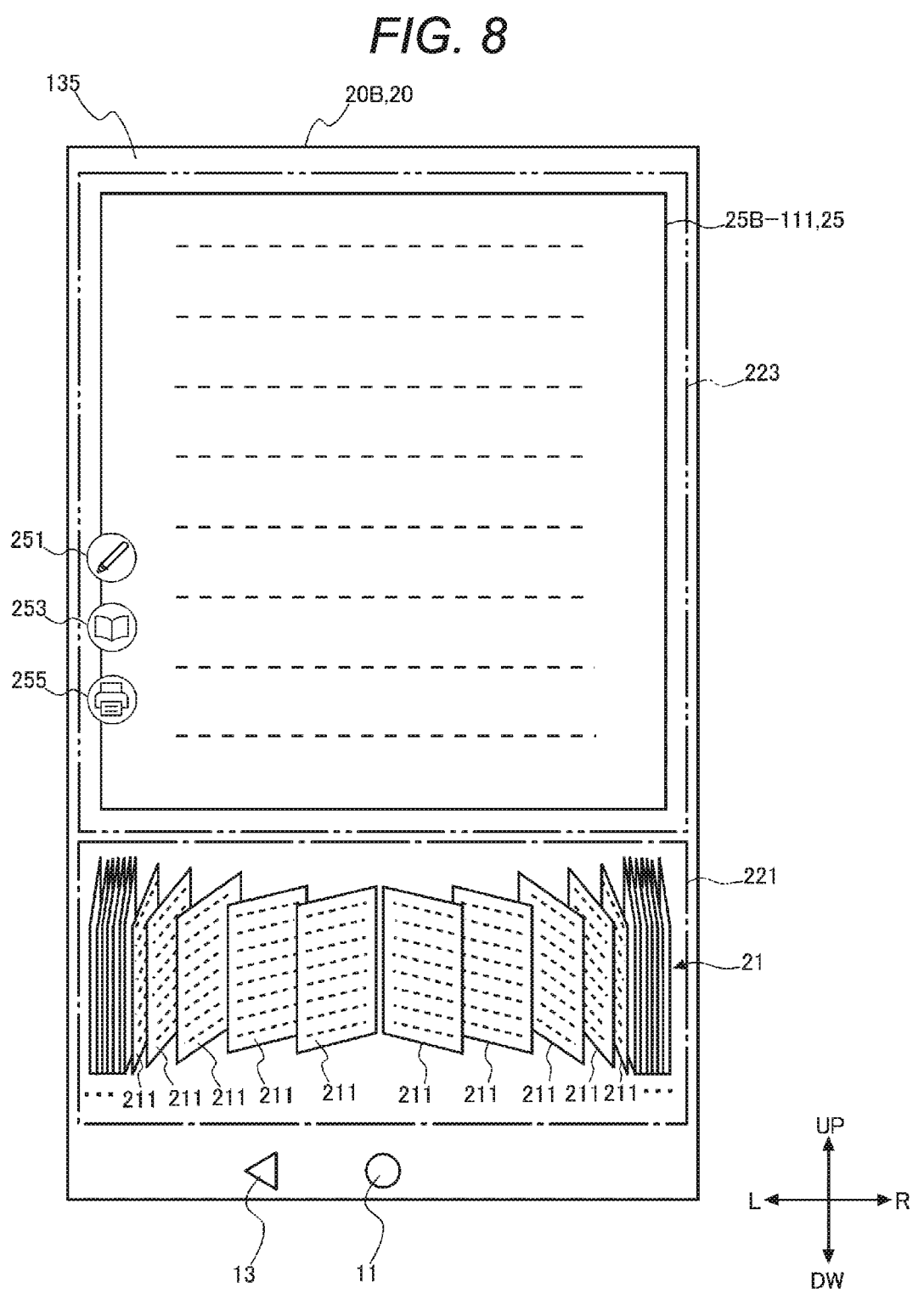

FIG. 8 shows an example of the view window 20B.

The view window 20B includes a first display area 221 and a second display area 223. Further, in the view window 20B, a handwriting icon 251, a display mode icon 253, a print icon 255, etc. are displayed.

The handwriting icon 251 is an icon for receiving an operation to instruct the display apparatus 100 to record a handwritten note by a touch operation.

Further, the display mode icon 253 is an icon for switching of the display mode of the second display area 223 between a first mode and a second mode. The first mode is a mode for a spread view of the page images 25 of two pages in the second display area 223. The second mode is a mode for display of the page images 25 one by one in the second display area 223.

The print icon 255 is an icon for receiving an operation to instruct a printer to print.

The first display area 221 is an area for displaying the bundle of thumbnail images 21 selected in the list window 20A. When the combination of the main thumbnail image 23 and the bundle of thumbnail images 21 is selected in the list window 20A, the bundle of thumbnail images 21 contained in the selected combination is displayed in the first display area 221.

The display control unit 173 changes the display form of the bundle of thumbnail images 21 when a predetermined touch operation such as a slide operation is performed using the pointer within the first display area 221.

When a slide operation in the rightward direction is performed within the first display area 221, the plurality of thumbnail images 211 move from left to right according to an amount of movement of the pointer in the rightward direction within the first display area 221. When a slide operation in the leftward direction is performed, the plurality of thumbnail images 211 move from right to left according to an amount of movement of the pointer in the leftward direction within the first display area 221.

Figure 9:
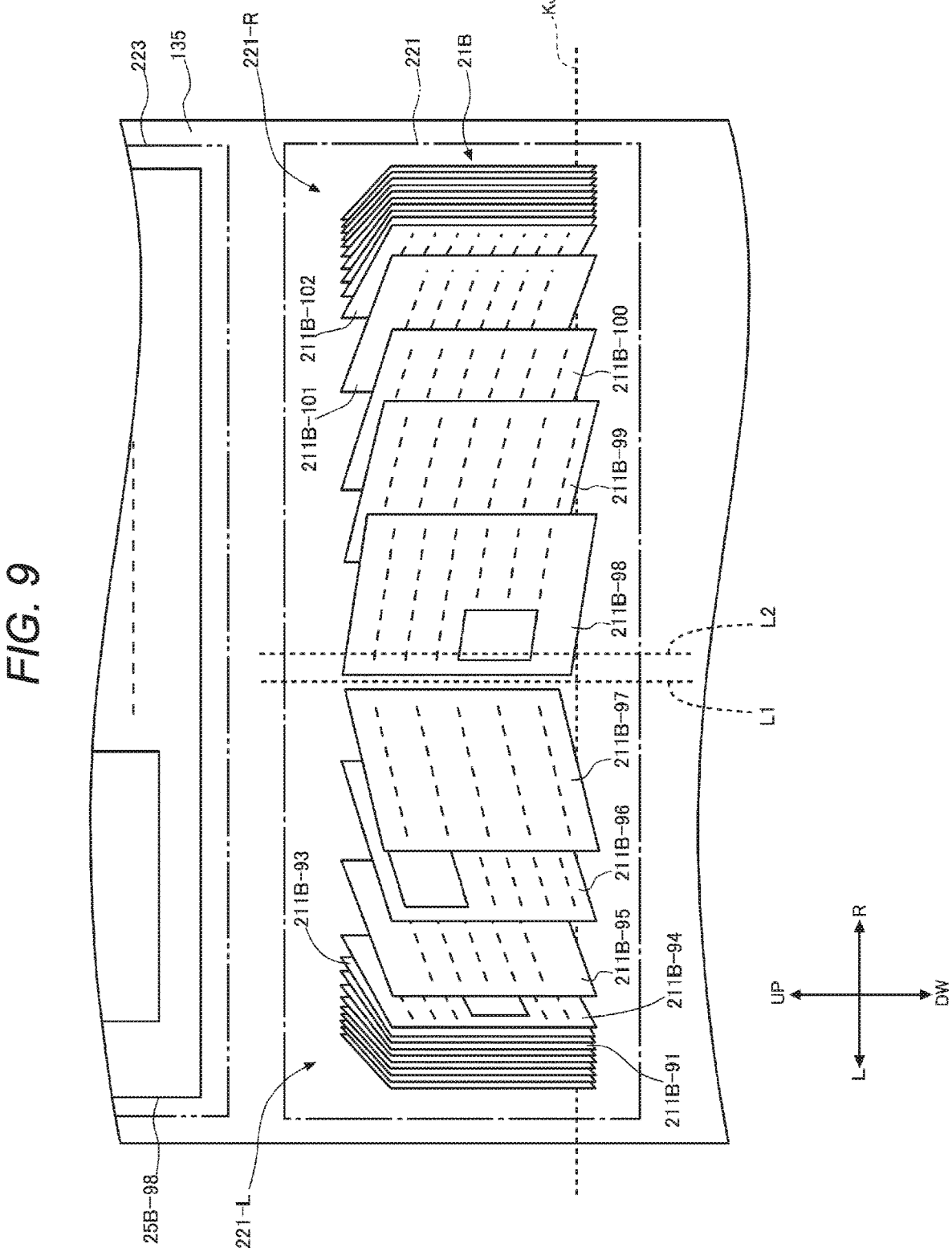
FIG. 9 shows an example of the bundle of thumbnail images displayed in a first display area.

The second display area 223 is an area for displaying the page image 25 of the page corresponding to the thumbnail image 211 selected in the first display area 221. In FIGS. 8 and 9, a page image 25 corresponding to the Mth page of a document shown by the document file 165N is referred to as "page image 25N-M". M is an integer equal to or larger than 1. The page image 25B-111 shown in FIG. 8 shows the page image 25 corresponding to the 111th page of the document file 165B.

In the second display area 223, a predetermined touch operation such as a slide operation is performed using the pointer, and thereby, the displayed page image 25 is changed.

When a predetermined touch operation in the rightward direction is performed in the second display area 223, the page image 25 of the page anterior to the page corresponding to the page image 25 displayed before the touch operation is displayed within the second display area 223. When a predetermined touch operation in the leftward direction is performed within the second display area 223, the page image 25 of the page posterior to the page corresponding to the page image 25 displayed before the touch operation is displayed within the second display area 223.

In the state in FIG. 8, when a slide operation in the rightward direction is performed within the second display area 223, the page image 25B-110 of the page anterior to the page image 25B-111 is displayed in the second display area 223. The illustration of the page image 25B-110 is omitted.

Further, in the state in FIG. 8, when a slide operation in the leftward direction is performed within the second display area 223, the page image 25B-112 of the page posterior to the page image 25B-111 is displayed in the second display area 223. The illustration of the page image 25B-112 is omitted.

In the description of FIGS. 8 and 9, the thumbnail image 211 corresponding to the Mth page of the document of the document file 165N is referred to as "thumbnail image 211N-M". For example, the thumbnail image 211N-98 shows the thumbnail image 211 corresponding to the 98th page of the document file 165B.

When the page image 25 displayed in the second display area 223 is changed, the display form of the bundle of thumbnail images 21 changes within the first display area 221. That is, the thumbnail image 211 corresponding to the changed page image 25 is displayed nearly at the center in the leftward and rightward directions of the first display area 221. For example, when the page image 25B-110 is displayed in the second display area 223, the thumbnail image 211B-110 is displayed nearly at the center in the leftward and rightward directions of the first display area 221. Or, when the page image 25B-112 is displayed in the second display area 223, the thumbnail image 211B-112 is displayed nearly at the center in the leftward and rightward directions of the first display area 221.

When a slide operation is performed within the first display area 221 and the thumbnail image 211B-110 is displayed nearly at the center in the leftward and rightward directions of the first display area 221, the page image 25B-110 is displayed in the second display area 223. Similarly, when a slide operation is performed within the first display area 221 and the thumbnail image 211B-112 is displayed nearly at the center in the leftward and rightward directions of the first display area 221, the page image 25B-112 is displayed in the second display area 223.

Here, the bundle of thumbnail images 21 displayed in first display area 221 is specifically explained. FIG. 9 shows an example of the bundle of thumbnail images 21 displayed in the first display area 221. FIG. 9 shows a display form of the first display area 221 when the page image 25B-98 is displayed in the second display area 223. The bundle of thumbnail images 21B is displayed in the first display area 221, and the thumbnail image 211B-98 is displayed nearly at the center in the leftward and rightward directions of the first display area 221.

In the first display area 221, the respective thumbnail images 211 are arranged and displayed on a virtual axis KJ of the display surface 135 of the touch panel 131. The virtual axis KJ is an axis parallel to the leftward and rightward directions.

The first display area 221 has a right area 221R and a left area 221L. The right area 221R and the left area 221L are arranged in the leftward and rightward directions with a switch line L1 in between. The switch line L1 is a virtual line located on the left of a center line L2 indicating the center in the leftward and rightward directions of the first display area 221 and extends in the upward and downward directions. The center line L2 also extends in the upward and downward directions like the switch line L1.

In FIG. 9, the thumbnail image 211B-98 is displayed on the center line L2. The thumbnail image 211B-97 corresponding to the page anterior to the page corresponding to the thumbnail image 211B-98 is displayed in the left area 221L. The thumbnail image 211B-98 and the thumbnail image 211B-99 are displayed in the right area 221R.

In the first display area 221, the face of the thumbnail image 211 is changed with reference to the switch line L1.

Figure 10:
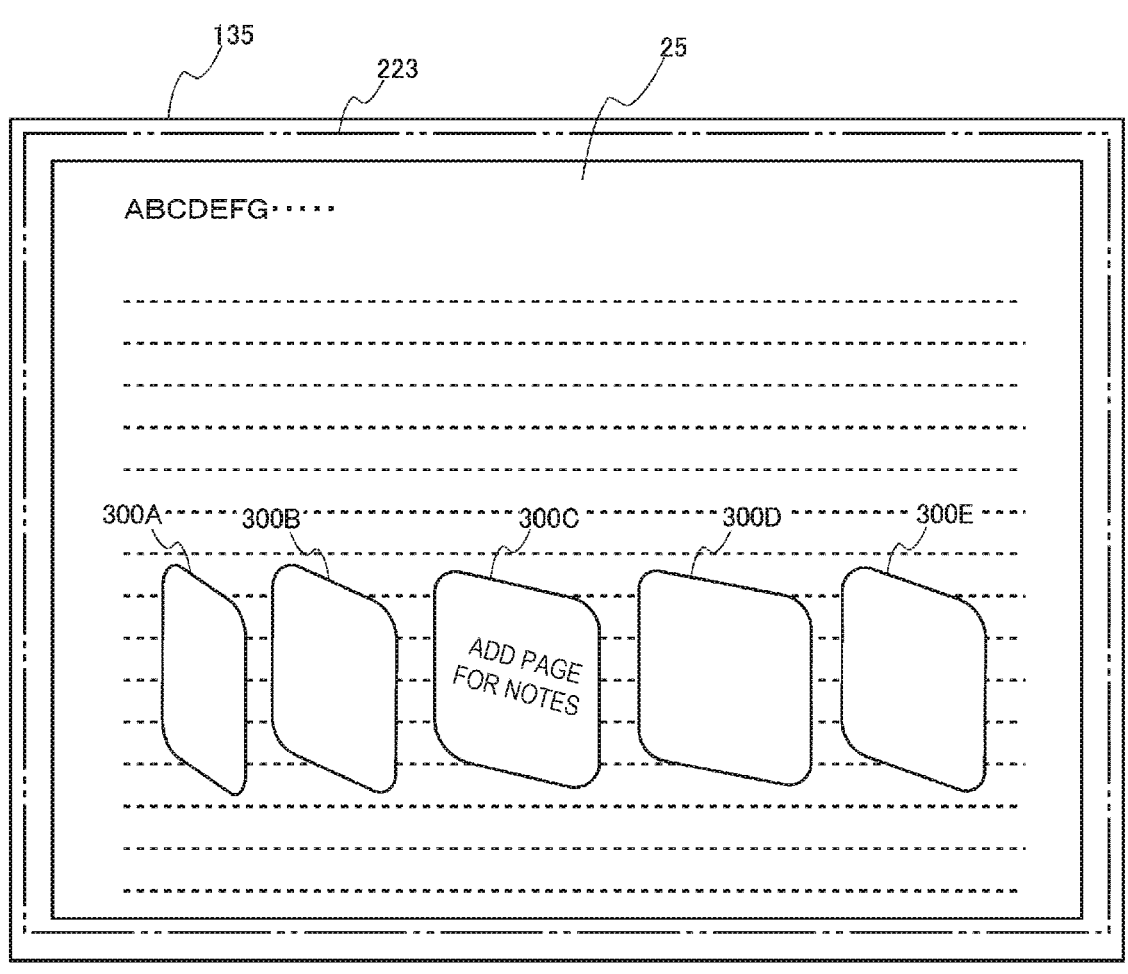
FIG. 10 shows first operation icons.
Figure 10:
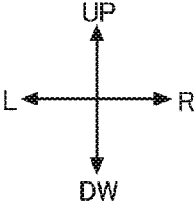

FIG. 10 shows the first operation icons 300. Note that, for simplification of illustration, FIG. 10 shows only the second display area 223 of the app window 20.

When the page image 25 displayed in the second display area 223 or the thumbnail image 211 displayed in the first display area 221 is tapped and held, the control section 150 displays the first operation icons 300 shown in FIG. 10 in the second display area 223. The first operation icons 300 are icons showing processing to be executed by the display apparatus 100.

FIG. 10 shows five icons of the first operation icons 300A, 300B, 300C, 300D, and 300E as the first operation icons 300, however, the number of the displayed first operation icons 300 is not limited to five.

For example, commands to add page for notes, print selected page, put tag, pin document, add to favorites, etc. are assigned to the first operation icons 300A, 300B, 300C, 300D, and 300E. In the embodiment, the command to add a page for notes is assigned to the first operation icon 300C.

Figure 11:
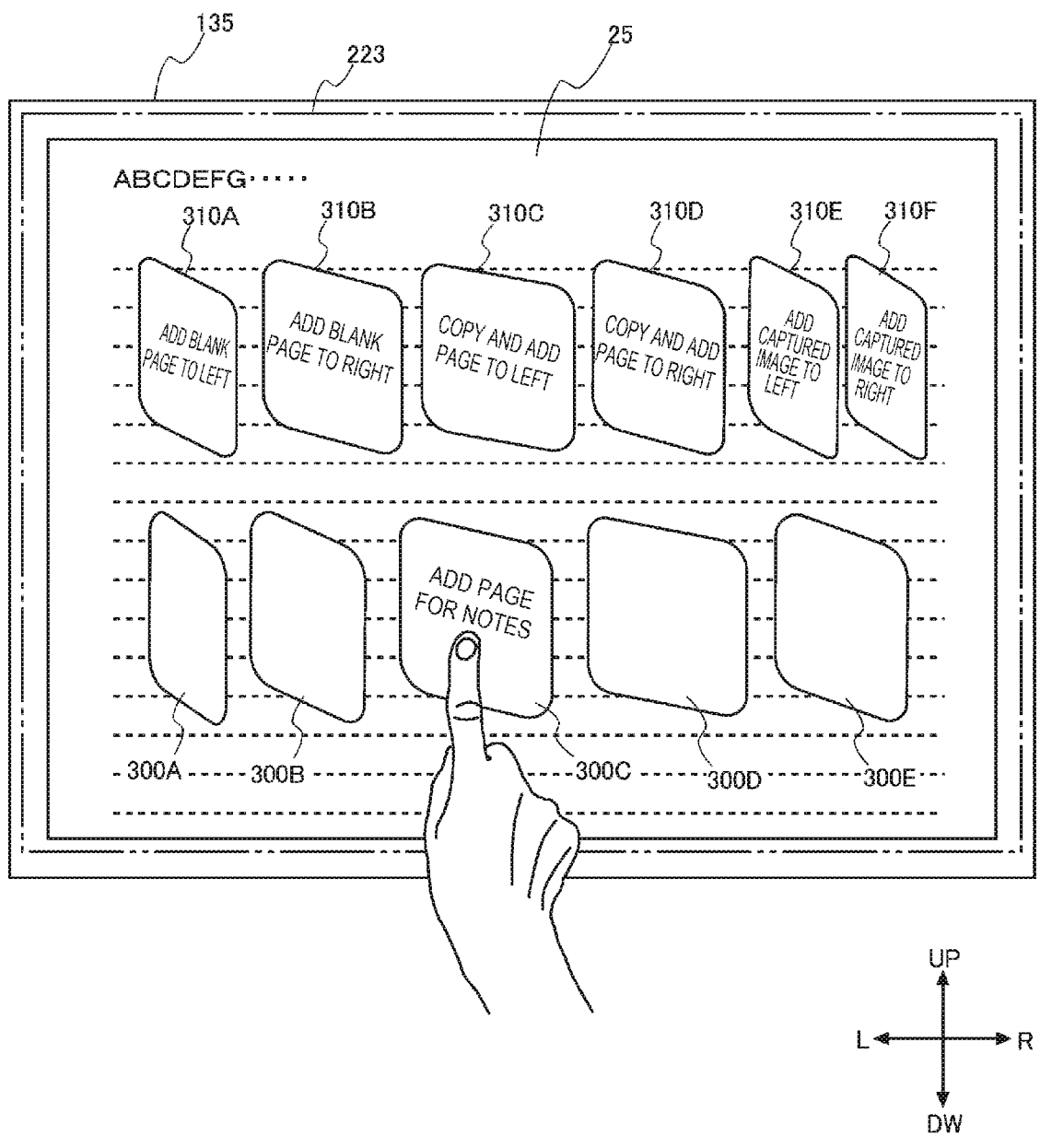
FIG. 11 shows second operation icons.

FIG. 11 shows the second operation icons 310. Note that, for simplification of illustration, FIG. 11 shows only the second display area 223 of the app window 20.

When the first operation icon 300C is selected by a touch operation by the user, the control section 150 displays the second operation icons 310 shown in FIG. 11 in the second display area 223. FIG. 11 shows six second operation icons 310 of the second operation icons 310A, 310B, 310C, 310D, 310E, 310F. Or, the second operation icons 310 may be displayed in the first display area 221.

The second operation icons 310A and 310B correspond to first operation images. The second operation icons 310C and 310D correspond to second operation images. The second operation icons 310E and 310F correspond to third operation images.

In the embodiment, commands set for the second operation icons 310A, 310B, 310C, 310D, 310E, 310F are explained.

A command to add a blank page to the left of the tapped and held page image 25 or the page image 25 as the original of the tapped and held thumbnail image 211 is assigned to the second operation icon 310A. The blank page includes e.g., a white sheet and a ruled sheet.

Adding to the left of the page image 25 refers to displaying next to the page image 25 when the user performs a swipe operation from left to right of the touch panel 131 in a view of the drawing.

A command to add a blank page to the right of the tapped and held page image 25 or the page image 25 as the original of the tapped and held thumbnail image 211 is assigned to the second operation icon 310B.

Adding to the right of the page image 25 refers to displaying next to the page image 25 when the user performs a swipe operation from right to left of the touch panel 131 in the view of the drawing.

A command to add a copy of the page image 25 to the left of the tapped and held page image 25 or the page image 25 as the original of the tapped and held thumbnail image 211 is assigned to the second operation icon 310C.

Further, a command to add a copy of the displayed page image 25 being displayed to the right of the tapped and held page image 25 or the page image 25 as the original of the tapped and held thumbnail image 211 is assigned to the second operation icon 310D.

A command to add a captured image captured by the camera 120 or a captured image stored in the memory unit 160 to the left of the tapped and held page image 25 or the page image 25 as the original of the tapped and held thumbnail image 211 is assigned to the second operation icon 310E.

A command to add a captured image captured by the camera 120 or a captured image stored in the memory unit 160 to the right of the tapped and held page image 25 or the page image 25 as the original of the tapped and held thumbnail image 211 is assigned to the second operation icon 310F.

Figure 12:
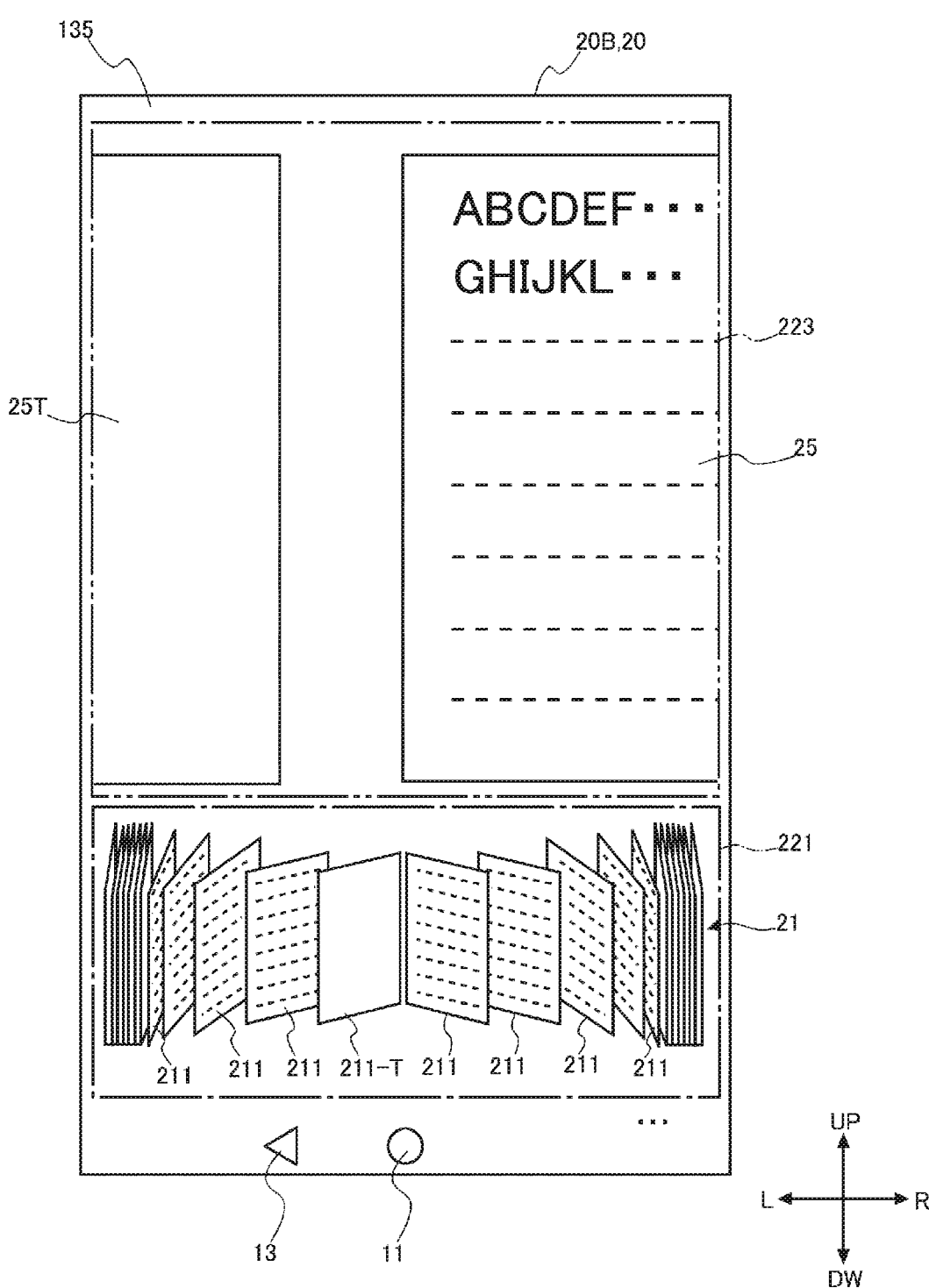
FIG. 12 shows a change of display in a second display area.
Figure 13:
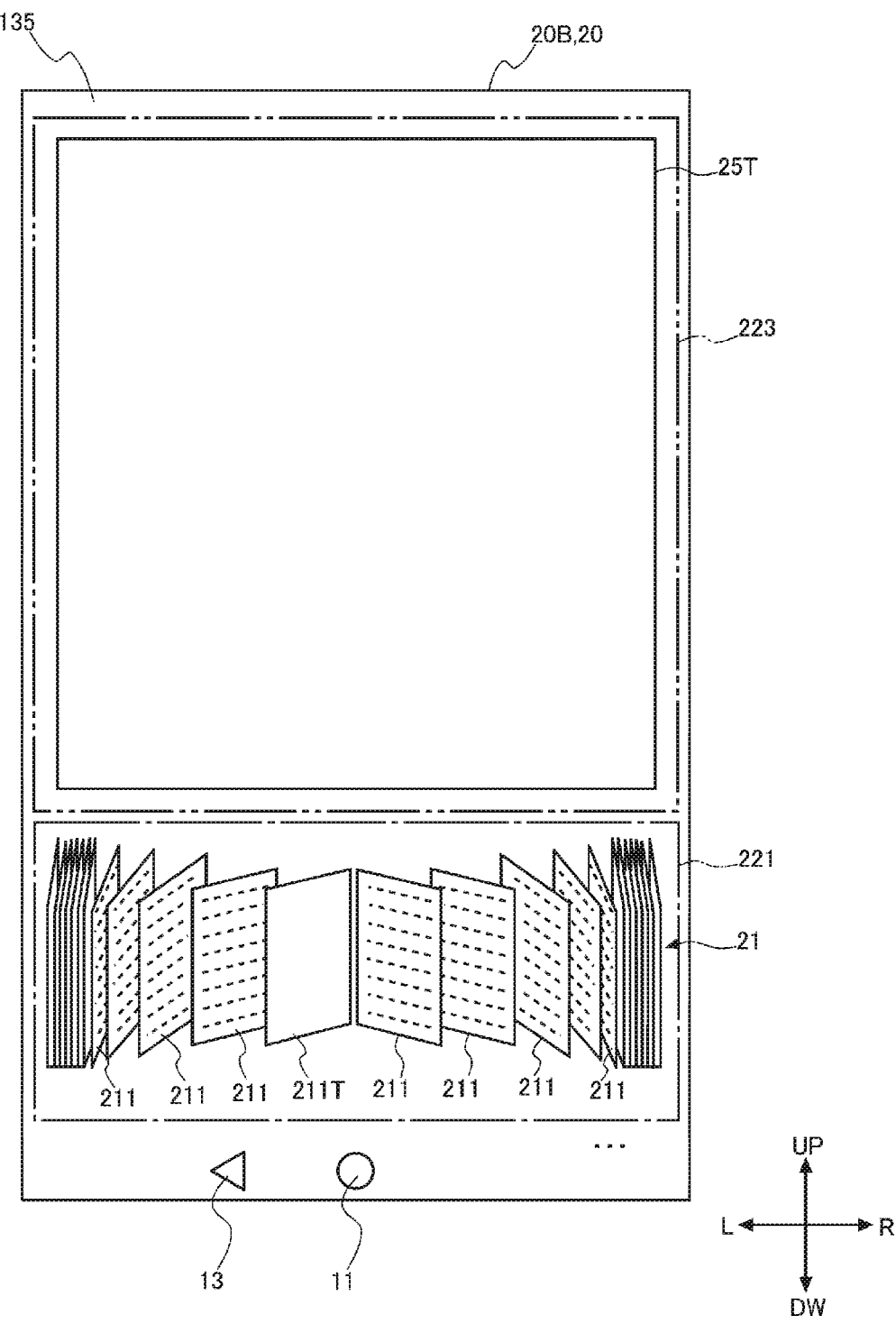
FIG. 13 shows a change of display in the second display area.

FIGS. 12 and 13 show changes of display of the second display area 223 when the second operation icon 310A is selected. Note that the page image 25 being displayed in the second display area 223 is the page image 25 displayed in the second display area 223 before the second operation icon 310B is selected.

When the second operation icon 310A is selected and the command to add a blank page to the left of the page image 25 being displayed in the second display area 223 is received, the control section 150 first reduces the blank page image 25 and adds a thumbnail image 211T to the first display area 221.

Then, the control section 150 displays the page image 25 of the blank page gradually from the left side of the touch panel 131 while moving the page image 25 being displayed in the second display area 223 from left to right of the touch panel 131 in the view of the drawing. Hereinafter, the page image 25 of the blank page is called an additional page and referred to as "additional page image 25T". Then, when the movement of the page image 25 in the rightward direction is completed and the display of the page image 25 in the second display area 223 is removed, as shown in FIG. 13, the control section 150 displays the additional page image 25T of the blank page on the entire surface of the second display area 223.

Figure 14:
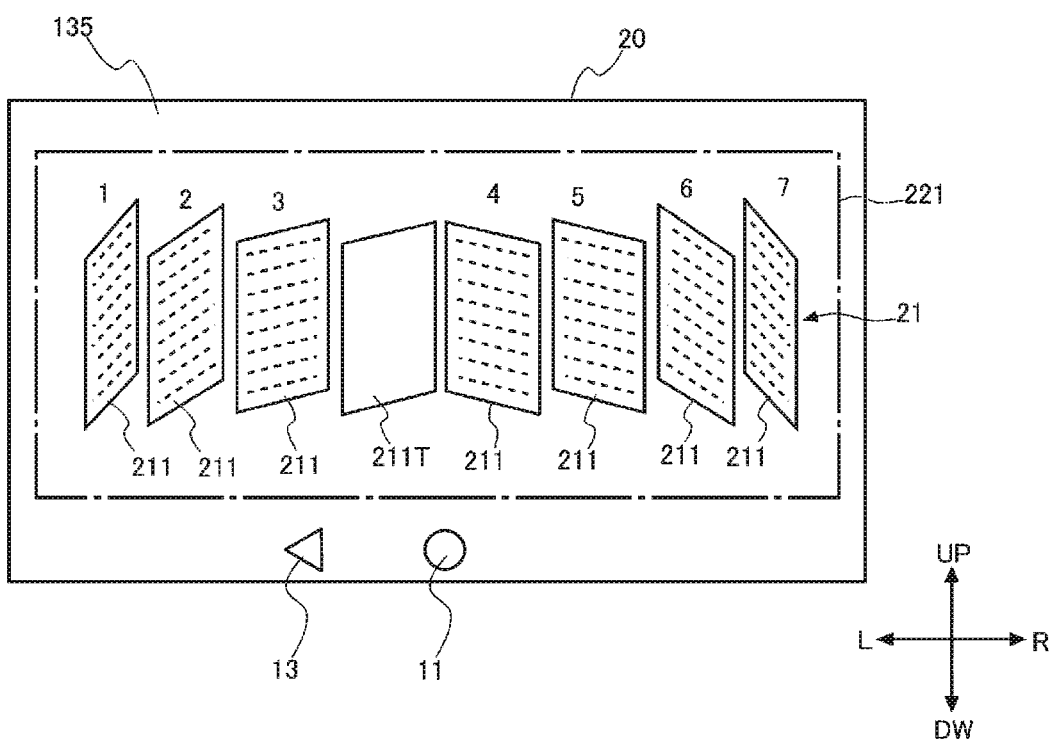
FIG. 14 shows the first display area.

FIG. 14 shows the first display area 221. Note that, for simplification of illustration, FIG. 14 shows only the first display area 221 of the app window 20.

FIG. 14 shows a display state of the first display area 221 when the additional page image 25T is added. As shown in FIG. 14, page numbers are displayed for the thumbnail images 211 of the page images 25 generated based on the document file 165, however, no page number is displayed for the thumbnail image 211T of the newly added additional page image 25T. Thereby, the additional page may be indicated as the added page without changes of the page numbers of the pages contained in the document file 165.

Figure 15:
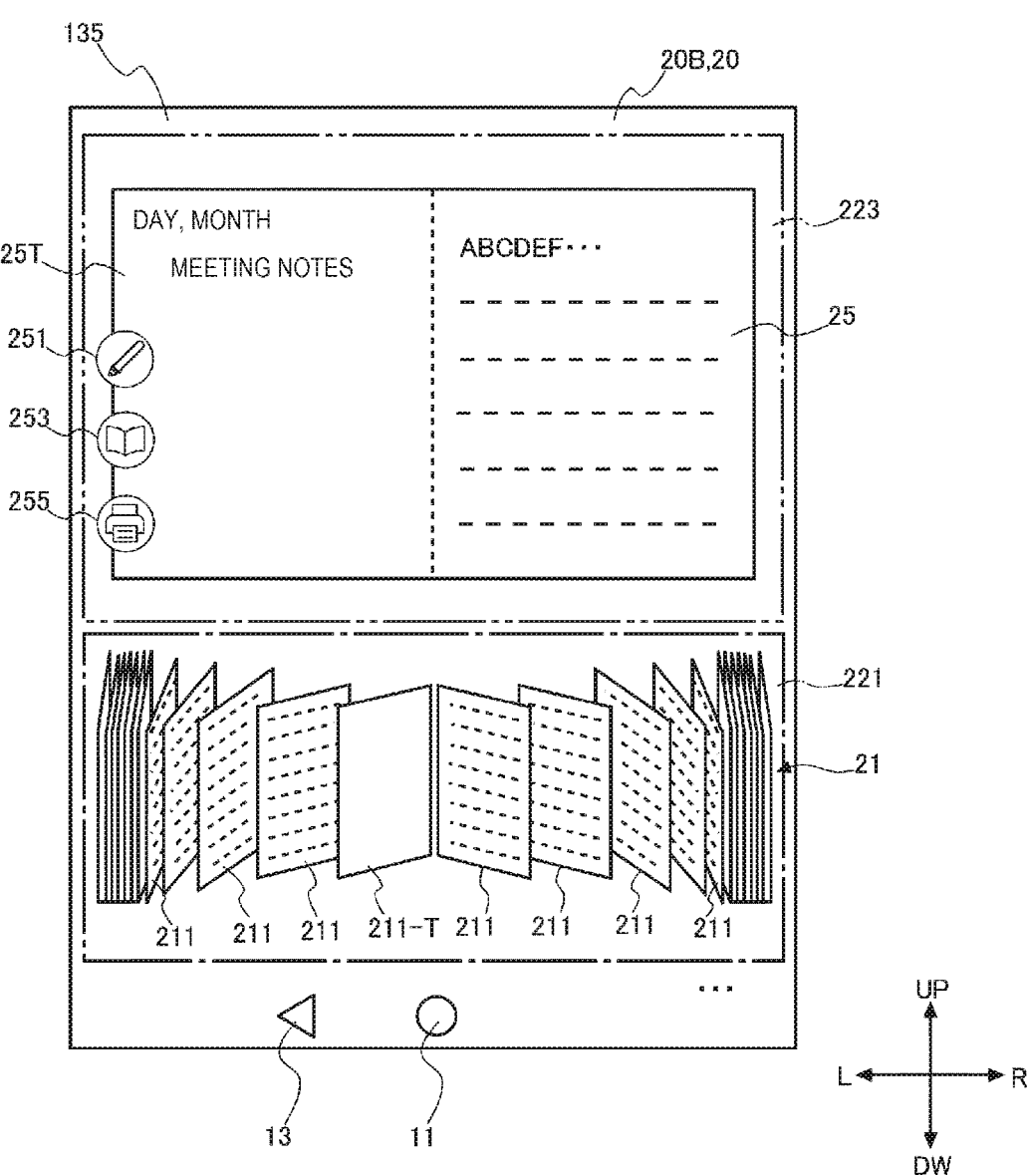
FIG. 15 shows a display state of a spread view of page images of a plurality of pages.

FIG. 15 shows a display state of a spread view of the page images 25 of the plurality of pages. The user may change the display mode of the display apparatus 100 to the first mode or the second mode by tapping and holding the display mode icon 253.

FIG. 15 shows a state in which the first mode is selected by the operation of the display mode icon 253 and the additional page image 25T and the page 25 are displayed in a spread view in the second display area 223. A note entered by the user by a touch operation is displayed in the additional page image 25T.

The user selects the handwriting icon 251 and enters characters, figures, signs, etc. by a touch operation in the display surface 135, and thereby, may draw the characters, figures, signs, etc. corresponding to the touch operation in the additional page image 25T. The control section 150 generates drawing data by drawing a drawing line in the additional page image 25T according to a trajectory of the pointed position detected by the touch panel 131. Further, when saving of the document file is selected, the control section 150 stores the page number of the additional page image 25T and the drawing data as another file in the memory unit 160.

When drawing the drawing line according to the trajectory of the pointed position detected by the touch panel 131, the control section 150 changes opacity of the drawing line based on the type of the additional page image 25T or the page image 25. Specifically, for example, when the file format of the additional page image 25T is JPG, the control section 150 determines that the additional page image 25T is a captured image 26.

When drawing the drawing line in the additional page image 25T as the blank page image 25 or the page image 25 of the page contained in the document file 165, the control section 150 selects a drawing line having transparency as the drawing line.

When drawing the drawing line in the captured image 26, the control section 150 selects a drawing line not having transparency. The control section 150 draws characters, signs, and figures corresponding to the trajectory of the pointed position entered by the user using a finger or an electronic pen by the drawing line with opacity at 100%.

A case where the drawing line is drawn in the page image 25 of the page contained in the document file 165 is explained.

For example, it is assumed that a color of the page image 25 and a color of the drawing line are represented by RGB of red, green, and blue. A color of the area of the page image 25 with the drawing line superimposed thereon is displayed by a layered color of the color of the page image 25 and the color of the drawing line. The color of the area of the page image 25 with the drawing line superimposed thereon is a basic color×(a synthetic color/255).

The basic color is a color of the page image 25 on which the drawing line is superimposed.

The synthetic color is a color of the drawing line drawn in the page image 25.

When displaying the page images 25 of the plurality of pages in a spread view as shown in FIG. 15, in an operation to turn the pages, the control section 150 displays the page image 25 to be displayed next in a slightly darker color than that of the page image 25 being turned. Further, the control section 150 displays the page images 25 to be displayed gradually in lighter colors while linearly changing the brightness in response to the progress of the operation to turn the pages. On the other hand, the previous page images 25 displayed with the page images 25 being turned gradually overlapped are displayed gradually in darker colors while linearly changing the brightness in response to the progress of the operation to turn the pages.

Particularly, when an aspect ratio of the next page image 25 to be displayed by turning of the page images 25 is different, the next page image 25 displayed as a background of the page image 25 is displayed to be gradually floating from the black background.

For example, the brightness of the additional page image 25T is increased according to the degree of the progress of the page turning of the page images 25. Then, when the page turning of the page images 25 is completed and the additional page image 25T is displayed in the second display area 223, the brightness of the additional page image 25T is changed so that the brightness of the additional page image 25T may be the same as the brightness of the page image 25 before turned.

As described above, when the page images 25 of the plurality of pages are displayed in the spread view, the brightness of the previous page image 25 and the next page image 25 is gradually changed and displayed during the page turning operation, and thereby, the user may perform the page turning operation without a feeling of strangeness.

Figure 16:
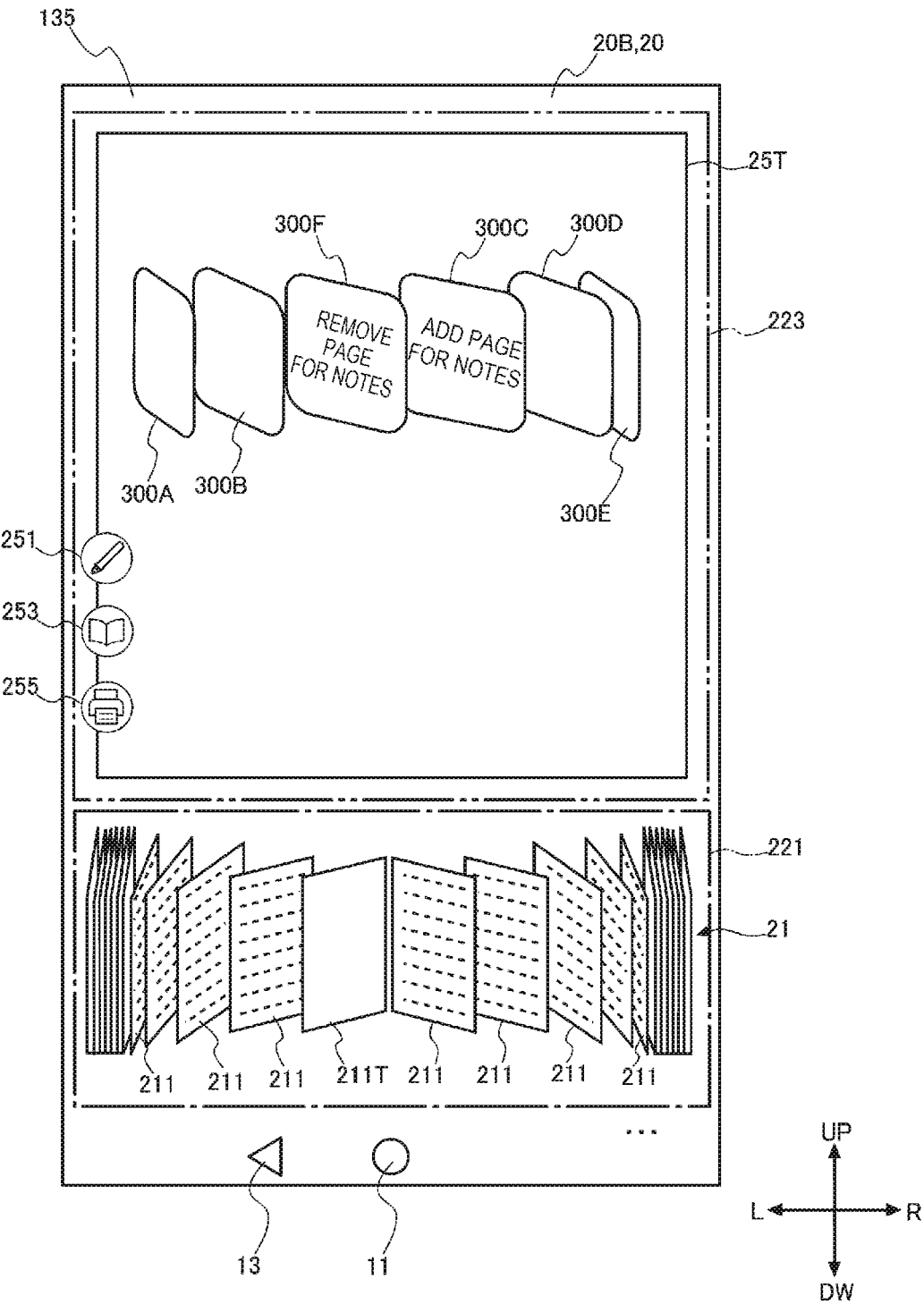
FIG. 16 shows first operation icons displayed when an added page image or a thumbnail image of the added page image is tapped and held.

FIG. 16 shows the first operation icons 300 displayed when the additional page image 25T or the thumbnail image 211 of the additional page image 25T is tapped and held.

When the additional page image 25T or the thumbnail image 211 of the additional page image 25T is tapped and held, the control section 150 displays a first operation icon 300F in addition to the first operation icons 300A to 300E shown in FIG. 10. A command to remove the page for notes is assigned to the first operation icon 300F.

The first operation icons 300 and the second operation icons 310 are displayed even when the selected page image 25 is the additional page image 25T with the drawing line drawn therein.

When the second operation icon 310C or 310D is operated and an instruction to add a copy of the additional page image 25T with the drawing line drawn therein is entered, the control section 150 generates the copy of the additional page image 25T as another additional page image 25T. The control section 150 displays the generated additional page image 25T in the second display area 223.

Further, the control section 150 reduces the copy of the additional page image 25T and generates a thumbnail image 211, and displays a bundle of thumbnail images 21 containing the generated thumbnail image 211 in the first display area 221.

Figure 17:
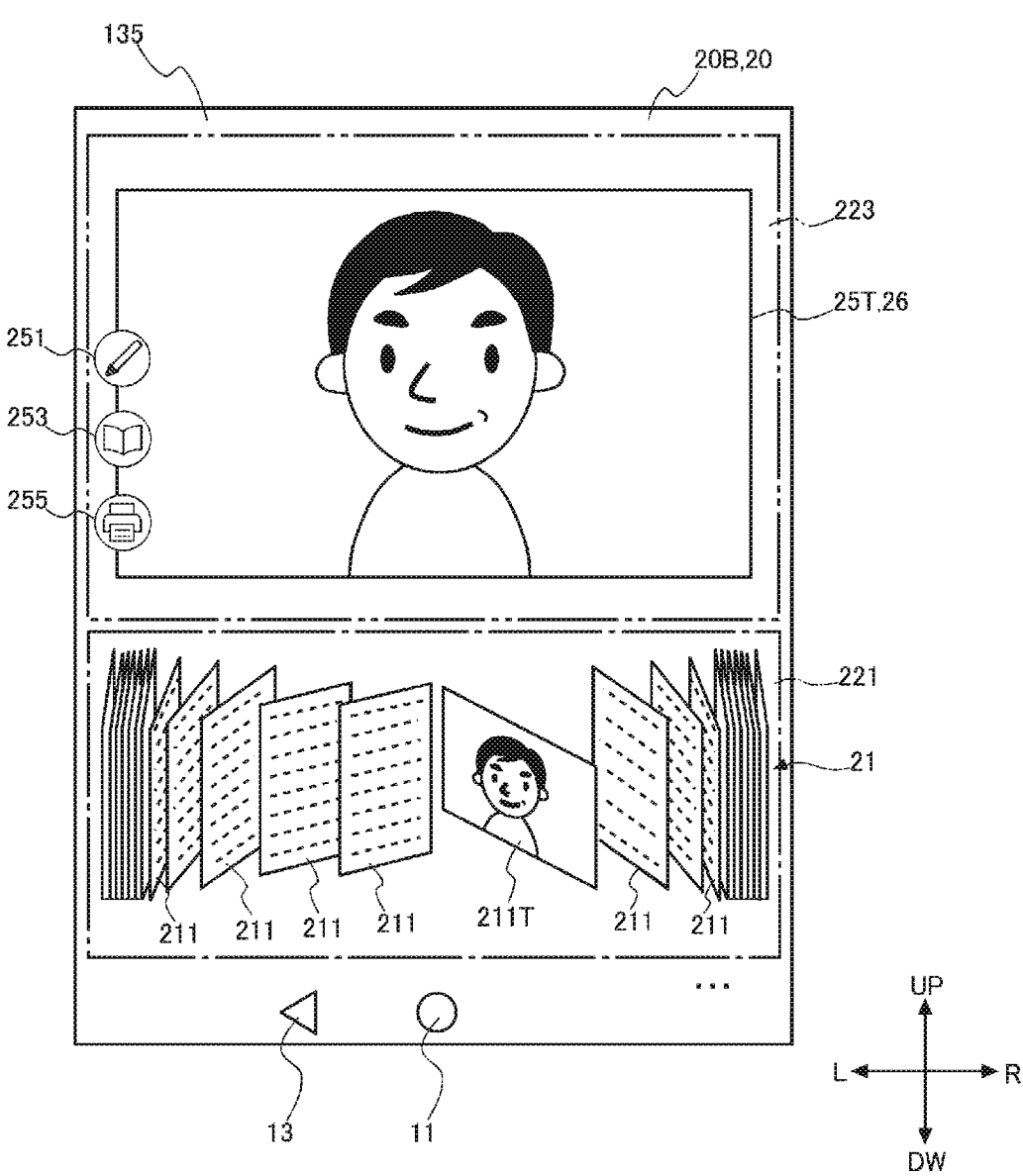
FIG. 17 shows a display state of a touch panel when a captured image is added as the page image of the added page.

FIG. 17 shows a display state of the touch panel 131 when a captured image is added as the additional page image 25T.

When a page contained in the document file 165 is selected as the additional page image 25T, the control section 150 sets an aspect ratio of the additional page image 25T based on an aspect ratio of the page contained in the document file 165. Further, when the captured image 26 is selected as the additional image, the aspect ratio of the additional page image 25T is set based on an aspect ratio of the selected captured image 26.

It is assumed that the page image 25 of the page contained in the document file 165 is an image displayed in a longitudinal view in the size A4. In this case, the thumbnail image 211 displayed in the first display area 221 is also displayed in a longitudinal view in correspondence with the page image 25.

On the other hand, for example, it is assumed that a lateral captured image 26 is selected by the operation of the second operation icon 310 as the captured image 26 captured by the camera 120. In this case, as shown in FIG. 17, both the thumbnail image 211-T displayed in the first display area 221 and the captured image 26 displayed as the additional page image 25T in the second display area 223 are inserted in the lateral orientation.

Figure 18:
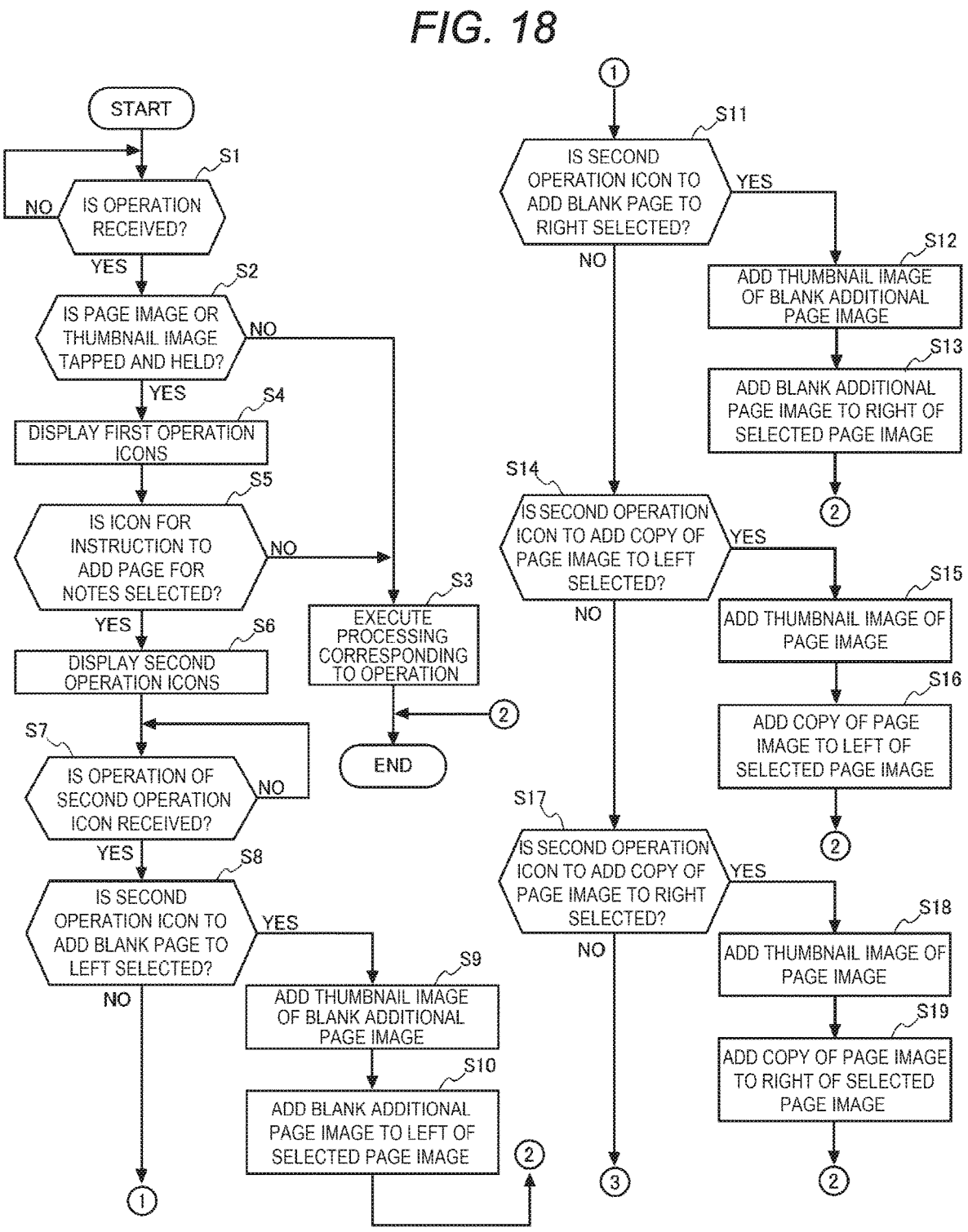
FIG. 18 is a flowchart showing an operation of the display apparatus.
Figure 19:
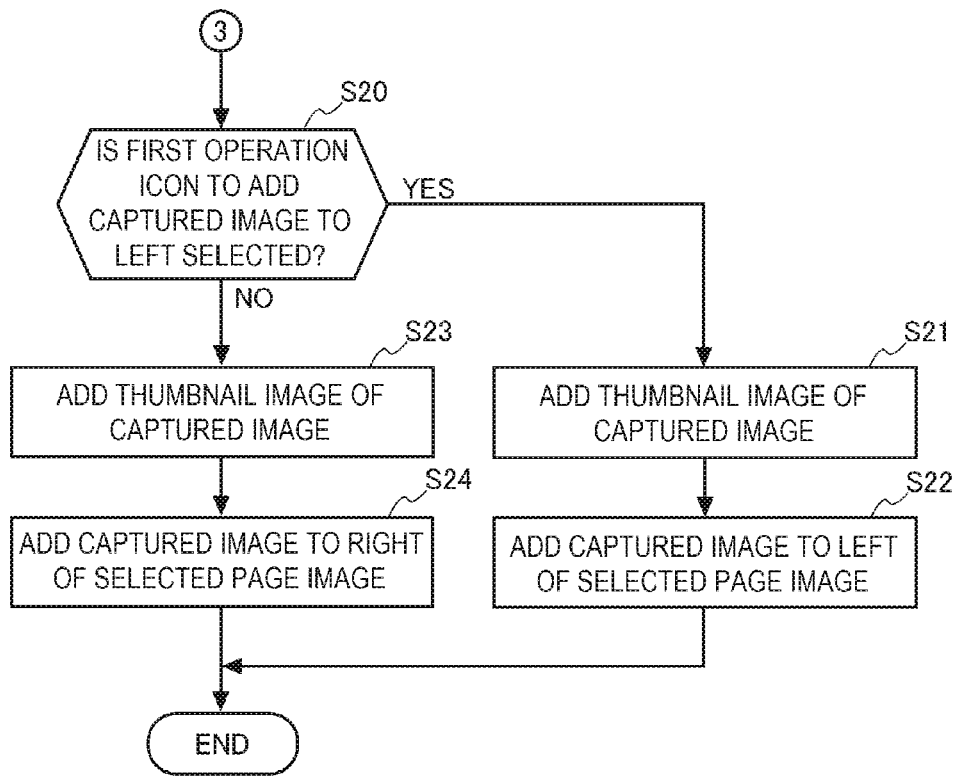
FIG. 19 is a flowchart showing the operation of the display apparatus.

FIGS. 18 and 19 are flowcharts showing an operation of the display apparatus 100.

The operation of the display apparatus 100 is explained with reference to the flowcharts in FIGS. 18 and 19.

First, the control section 150 determines whether an operation is received (step S1). When an operation is not received (step S1/NO), the control section 150 waits until an operation is received.

When an operation is received (step S1/YES), the control section 150 determines whether the received operation is a tap and hold operation to tap and hold the page image 25 or the thumbnail image 211 (step S2). When the received operation is not a tap and hold operation to tap and hold the page image 25 or the thumbnail image 211 (step S2/NO), the control section 150 executes processing corresponding to the operation (step S3) and ends the processing flow.

Or, when the received operation is a tap and hold operation to tap and hold the page image 25 or the thumbnail image 211 (step S2/YES), the control section 150 displays the first operation icons 300 in the second display area 223 (step S4) and waits until an operation of the first operation icons 300 is received.

Then, the control section 150 determines whether the first operation icon 300C to which the command to add a page for notes is assigned of the first operation icons 300 is operated (step S5). When the first operation icon 300C is not operated (step S5/NO), the control section 150 executes processing corresponding to the operation (step S3) and ends the processing flow.

When the first operation icon 300C is operated (step S5/YES), the control section 150 displays the second operation icons 310 (step S6) and waits until an operation of the second operation icons 310 is received.

When an operation of the second operation icons 310 is not received (step S7/NO), the control section 150 waits until an operation of the second operation icons 310 is received.

When an operation of the second operation icons 310 is received (step S7/YES), the control section 150 determines whether the second operation icon 310 for which the operation is received is the second operation icon 310A (step S8). That is, the control section 150 determines whether the second operation icon 310A for which the command to add a blank page to the left of the page image 25 being displayed in the second display area 223 is set is operated.

When determining that the second operation icon 310A is operated (step S8/YES), the control section 150 adds the thumbnail image 211T of the additional page image 25T added as a blank page to the bundle of thumbnail images 21 displayed in the first display area 221 (step S9). Then, the control section 150 adds the blank additional page image 25T to the left of the page image 25 being displayed in the second display area 223 (step S10).

When determining that the second operation icon 310 for which the operation is received is not the second operation icon 310A (step S8/NO), the control section 150 determines whether the second operation icon 310 for which the operation is received is the second operation icon 310B (step S11). That is, the control section 150 determines whether the second operation icon 310B for which the command to add a blank page to the right of the page image 25 being displayed in the second display area 223 is set is operated.

When determining that the second operation icon 310B is operated (step S11/YES), the control section 150 adds the thumbnail image 211T of the additional page image 25T added as a blank page to the bundle of thumbnail images 21 displayed in the first display area 221 (step S12). Then, the control section 150 adds the blank additional page image 25T to the right of the page image 25 being displayed in the second display area 223 (step S13).

When determining that the second operation icon 310 for which the operation is received is not the second operation icon 310B (step S11/NO), the control section 150 determines whether the second operation icon 310 for which the operation is received is the second operation icon 310C (step S14). That is, the control section 150 determines whether the second operation icon 310C for which the command to add a copy of the selected page image 25 to the left of the page image 25 being displayed in the second display area 223 is set is operated.

When determining that the second operation icon 310C is operated (step S14/YES), the control section 150 adds the thumbnail image 211 of the selected page image 25 to the bundle of thumbnail images 21 displayed in the first display area 221 (step S15). Then, the control section 150 adds the copy of the selected page image 25 as the additional page image 25T to the left of the page image 25 being displayed in the second display area 223 (step S16).

Or, when determining that the second operation icon 310 for which the operation is received is not the second operation icon 310C (step S14/NO), the control section 150 determines whether the second operation icon 310 for which the operation is received is the second operation icon 310D (step S17). That is, the control section 150 determines whether the second operation icon 310D for which the command to add a copy of the selected page image 25 to the right of the page image 25 being displayed in the second display area 223 is set is operated.

When determining that the second operation icon 310D is operated (step S17/YES), the control section 150 adds the thumbnail image 211 corresponding to the selected page image 25 to the bundle of thumbnail images 21 displayed in the first display area 221 (step S18). Then, the control section 150 adds the copy of the selected page image 25 as the additional page image 25T to the right of the page image 25 being displayed in the second display area 223 (step S19).

Or, when determining that the second operation icon 310 for which the operation is received is not the second operation icon 310D (step S17/NO), the control section 150 determines whether the second operation icon 310 for which the operation is received is the second operation icon 310E (step S20). That is, the control section 150 determines whether the second operation icon 310E for which the command to add a selected captured image 26 to the left of the page image 25 being displayed in the second display area 223 is set is operated.

When determining that the second operation icon 310E is operated (step S20/YES), the control section 150 adds the thumbnail image 211 of the selected captured image 26 to the bundle of thumbnail images 21 displayed in the first display area 221 (step S21). Then, the control section 150 adds the selected captured image 26 as the additional page image 25T to the left of the page image 25 being displayed in the second display area 223 (step S22).

Or, when determining that the second operation icon 310E is not operated (step S20/NO), the control section 150 determines that the second operation icon 310F is operated. That is, the control section 150 determines that the second operation icon 310F for which the command to add a selected captured image 26 to the right of the page image 25 being displayed in the second display area 223 is set is operated.

When determining that the second operation icon 310F is operated (step S20/NO), the control section 150 adds the thumbnail image 211 of the selected captured image 26 to the bundle of thumbnail images 21 displayed in the first display area 221 (step S23). Then, the control section 150 adds the selected captured image 26 as the additional page image 25T to the right of the page image 25 being displayed in the second display area 223 (step S24).

Figure 20:
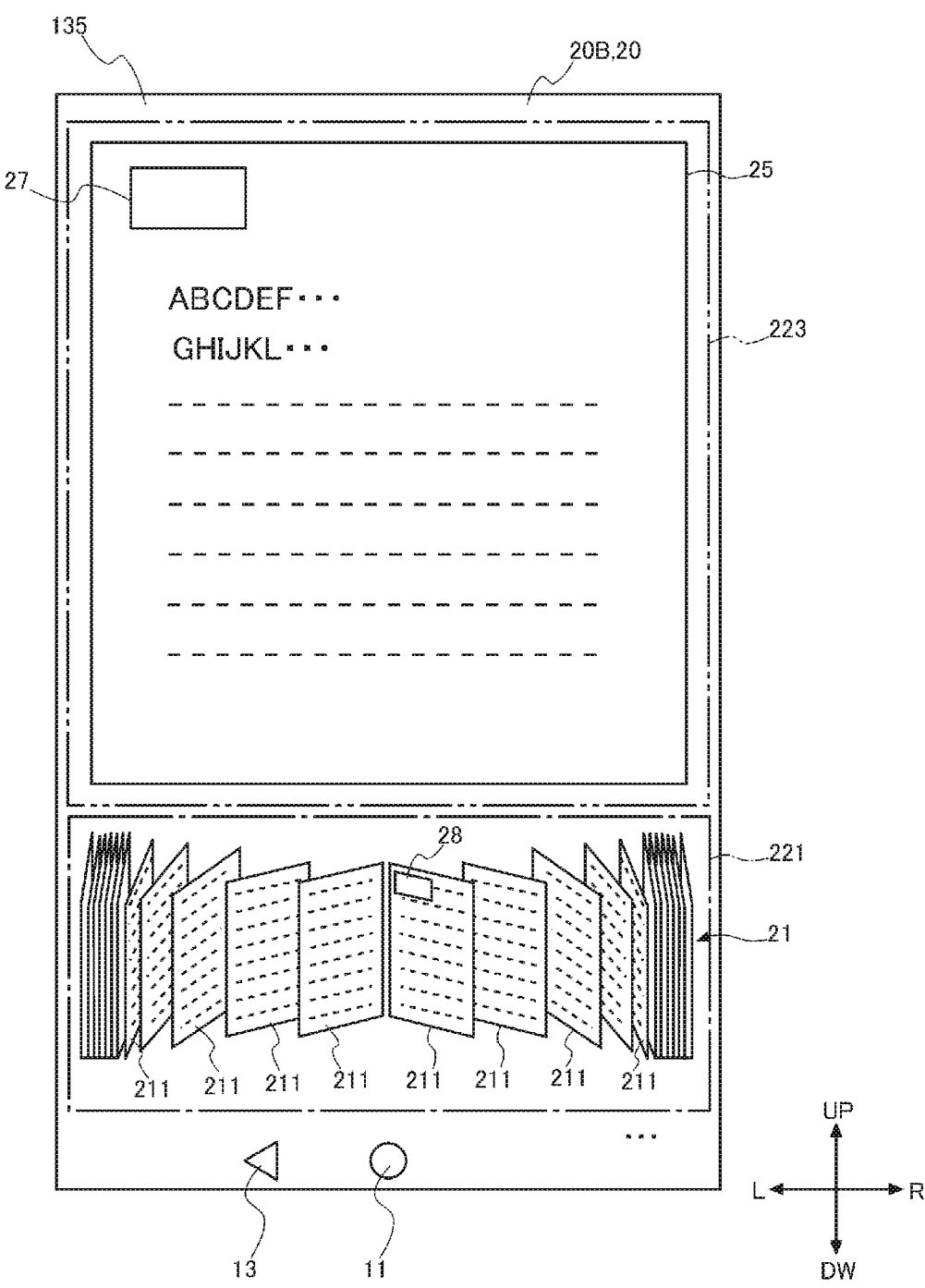
FIG. 20 shows an example of an app window of a modified example.

FIG. 20 shows an example of the app window 20 of a modified example.

For example, it is assumed that, as the second operation icon 310, the second operation icon 310C for which the command to copy and add the page to the left is set is selected by a touch operation by the user. In this case, the control section 150 generates the copy of the page image 25 tapped and held when the first operation icon 300C is operated as the additional page image 25T. Further, the control section 150 displays a generated reduced image 27 to be superimposed on the tapped and held page image 25 or the page image 25 as the original of the thumbnail image 211. That is, the reduced image 27 is displayed as a tag of the page image 25.

Furthermore, the control section 150 generates a thumbnail image 211 of the page image 25 with the reduced image 27 superimposed thereon. In the thumbnail image 211, a small image 28 formed by further reduction of the reduced image 27 is displayed. The control section 150 displays a bundle of thumbnail images 21 containing the generated thumbnail image 211 in the first display area 221.

When the reduced image 27 of the page image 25 is selected by a touch operation by the user, the control section 150 displays an additional page image 25T formed by enlargement of the reduced image 27 in the second display area 223. Then, the user selects the handwriting icon 251 and enters characters, figures, signs, etc. in the display surface 135 by a touch operation. Thereby, the characters, figures, signs, etc. corresponding to the touch operation may be drawn in the additional page image 25T.

As below, the summary of the present disclosure will be appended.

APPENDIX 1

A display apparatus includes a receiving unit receiving an operation, a display section, and a control section controlling the display section to display a display window including a first display area for displaying a bundle of images of reduced images of respective pages contained in a document file and a second display area for displaying a page image of part of the pages contained in the document file, wherein, when an instruction to add a page is received by the receiving unit, the control section displays a page image of an added additional page in the second display area and displays the bundle of images containing a reduced image of the page image of the additional page in the first display area.

According to the configuration, the page image of the additional page is displayed in the second display area and the bundle of images containing the reduced image formed by reduction of the page image of the additional page is displayed in the first display area. Therefore, the page contained in the document file and the bundle of images containing the reduced image formed by reduction of the additional page are displayed in the first display area, and, in the document file, the position where the additional page is added may be recognized and the user's convenience may be increased.

APPENDIX 2

In the display apparatus according to Appendix 1, the receiving unit receives a selection of a blank page, a copy of the page image of the page contained in the document file, or an externally input captured image as the additional page, and the control section displays the additional page received by the receiving unit in the second display area and displays the bundle of images containing the reduced image of the page image of the additional page in the first display area.

According to the configuration, as the additional page, the blank page, the copy of the page image of the page contained in the document file, or the externally input captured image may be added.

APPENDIX 3

In the display apparatus according to Appendix 2, when the page contained in the document file is selected as the additional page, the control section sets an aspect ratio of the additional page based on an aspect ratio of the page contained in the document file, and, when the captured image is selected as the additional page, sets an aspect ratio of the additional page based on an aspect ratio of the externally input captured image.

According to the configuration, the aspect ratio of the additional page is set based on the aspect ratio of the selected page or the captured image.

APPENDIX 4

In the display apparatus according to Appendix 2 or 3, the control section draws a drawing line on the additional page according to a trajectory of a pointed position received by the receiving unit, when the additional page is the blank page, draws the drawing line having transparency on the additional page, and, when the additional page is the captured image, draws the drawing line not having transparency on the additional page.

According to the configuration, when the additional page is the blank page, the drawing line having transparency may be drawn on the additional page, and, when the additional page is the captured image, the drawing line not having transparency may be drawn on the additional page.

Therefore, when the additional page is the blank page, difficulty in visibility of characters and figures displayed on the additional page due to the drawing line may be prevented. Further, when the additional page is the captured image, visibility of the drawing line drawn on the captured image may be increased.

APPENDIX 5

In the display apparatus according to Appendix 4, the receiving unit receives a selection of the additional page with the drawing line drawn thereon as the additional page, and the control section displays the additional page received by the receiving unit in the second display area and displays the bundle of images containing the reduced image of the page image of the additional page in the first display area.

According to the configuration, the additional page with the drawing line drawn thereon may be further added as the additional page.

APPENDIX 6

In the display apparatus according to any one of Appendices 1 to 5, the control section displays the page image of the additional page anterior or posterior to the page selected by the operation received by the receiving unit.

According to the configuration, when the additional page is added, addition anterior to the selected page or addition posterior to the selected page may be selected.

APPENDIX 7

In the display apparatus according to any one of Appendices 1 to 6, when displaying the bundle of images containing the reduced image of the page image of the additional page in the first display area, the control section does not attach a page number to the reduced image of the page image of the additional page.

According to the configuration, the page numbers of the pages contained in the document file are unchanged, and the additional page may be indicated as an added page.

APPENDIX 8

In the display apparatus according to any one of Appendices 2 to 4, the control section displays a first operation image for receiving an operation to select the blank page, a second operation image for receiving an operation to select the copy of the page image of the page contained in the document file, and a third operation image for receiving an operation to select the externally input captured image, determines which of the first operation image, the second operation image, and the third operation image is operated, and determines which of the blank page, the copy of the page image of the page contained in the document file, and the externally input captured image to add as the additional page, and the first operation image, the second operation image, and the third operation image are arranged along a first virtual axis, rotated around a second virtual axis crossing the first virtual axis, and deformed to be viewed overhead from diagonally above the first operation image, the second operation image, and the third operation image.

According to the configuration, one of the first operation image, the second operation image, and the third operation image is selected, and thereby, the blank page, the copy of the page contained in the document file, or the captured image may be added as the additional page. Further, the first operation image, the second operation image, and the third operation image are arranged along the first virtual axis, rotated around the second virtual axis crossing the first virtual axis, and deformed to be viewed overhead from diagonally above the first operation image, the second operation image, and the third operation image, and thereby, the first operation image, the second operation image, and the third operation image may be easily searched.

APPENDIX 9

A display apparatus includes a receiving unit receiving an operation, a display section, and a control section controlling the display section to display a display window including a first display area for displaying a bundle of images of reduced images of respective pages contained in a document file and a second display area for displaying a page image of part of the pages contained in the document file, when an instruction to add a page is received by the receiving unit, the control section generates a reduced page image formed by reduction of a page image of an added additional page, superimposes and displays the reduced page image on a page image of a page selected by the operation received by the receiving unit in the second display area, and displays the bundle of images of the reduced images of the page image on which the reduced page image is superimposed in the first display area.

According to the configuration, the reduced image formed by reduction of the page image of the additional page is superimposed on the page image of the selected page and displayed in the second display area and the bundle of reduced images of the page image on which the reduced page image is superimposed is displayed in the first display area. Therefore, in the document file, the position where the additional page is added may be recognized and the user's convenience may be increased.

APPENDIX 10

A control method for a display apparatus includes controlling a display section to display a display window including a first display area for displaying a bundle of images of reduced images of respective pages contained in a document file and a second display area for displaying a page image of part of the pages contained in the document file, when receiving an instruction to add a page, displaying a page image of an added additional page in the second display area, and displaying the bundle of images containing a reduced image of the page image of the additional page in the first display area.

According to the configuration, the page image of the additional page is displayed in the second display area and the bundle of images containing the reduced image formed by reduction of the page image of the additional page is displayed in the first display area. Therefore, the page contained in the document file and the bundle of images containing the reduced image formed by reduction of the additional page are displayed in the first display area, and, in the document file, the position where the additional page is added may be recognized and the user's convenience may be increased.

APPENDIX 11

A non-transitory computer-readable storage medium storing a program for controlling a computer to execute a procedure of controlling a display section to display a display window including a first display area for displaying a bundle of images of reduced images of respective pages contained in a document file and a second display area for displaying a page image of part of pages contained in a document file, a procedure of, when receiving an instruction to add a page, displaying a page image of an added additional page in the second display area, and a procedure of displaying a bundle of images containing a reduced image of the page image of the additional page in a first display area.

According to the configuration, the page image of the additional page is displayed in the second display area and the bundle of images containing the reduced image formed by reduction of the page image of the additional page is displayed in the first display area. Therefore, the page contained in the document file and the bundle of images containing the reduced image formed by reduction of the additional page are displayed in the first display area, and, in the document file, the position where the additional page is added may be recognized and the user's convenience may be increased.

The above described embodiments are preferred embodiments of the present disclosure. Note that the present disclosure is not limited to the above described aspects, but various modifications can be made without departing from the scope of the present disclosure.

For example, the respective functional units of the display apparatus 100 shown in FIG. 1 show the functional configurations and the specific mounting forms are not particularly limited. That is, hardware individually corresponding to the respective functional units is not necessarily mounted, but, obviously, a single processor may realize the functions of the plurality of functional units by executing a program. Further, part of the functions realized by software in the above described embodiments may be realized by hardware and part of the functions realized by hardware in the above described embodiments may be realized by software. In addition, the specific detailed configurations of the other respective units of the display apparatus 100 can be arbitrarily changed without departing from the scope of the present disclosure.

The units of processing of the flowcharts shown in FIGS. 18 and 19 are formed by division according to main details of processing for ease of understanding of the processing of the display apparatus 100. The present disclosure is not limited by the way of division and the names of the units of processing shown in the flowcharts in FIGS. 18 and 19. Further, the processing of the control section 150 may be divided into more units of processing according to the details of processing or may be divided so that one unit of processing may include more processing. The orders of the processing in the flowcharts are not limited to the illustrated examples.

When the control method for the display apparatus is realized by a computer of the display apparatus 100, a program to be executed by the computer can be configured in a form of a storage medium. Or, the program to be executed by the computer can be configured in a form of a transmission medium transmitting the program. For the storage medium, a magnetic, optical storage medium or a semiconductor memory device may be used. Specifically, the storage medium includes a portable of fixed storage medium such as a flexible disc, an HDD (Hard Disk Drive), a CD-ROM, a DVD (Digital Versatile Disc), a Blu-ray Disc, a magnetooptical disc, a flash memory, and a card-type storage medium. Further, the storage medium may be a non-volatile storage medium including a RAM, a ROM, and an HDD as internal storage devices provided in a server apparatus. The Blu-ray is a registered trademark.

What is claimed is:

1. A display apparatus comprising:
   a touch screen configured to receive user-initiated touch operations;
   a display section; and
   a control section configured to control the display section to display a display window on the touch screen, the display window including a first display area for displaying a bundle of reduced images of respective pages contained in a document file and a second display area for displaying a page image of part of the pages contained in the document file, wherein
   the control section is further configured such that when an instruction to add a page is received by the touch screen while the touch screen is displaying the display window, the control section displays a page image of an additional page not previously contained within the document file, such that the page image is displayed in the second display area and such that the bundle of reduced images displayed in the first display area is augmented to include a reduced image of the page image of the additional page, the control section is configured such that the instruction to add a page represents a selection of a blank page, a copy of the page image of the page contained in the document file, or an externally input captured image as the additional page, the control section is configured such that when the touch screen receives a selection of the additional page with the drawing line drawn thereon as the additional page, and the control section displays the additional page received by the touch screen in the second display area and displays the bundle of reduced images containing the reduced image of the page image of the additional page in the first display area.

2. The display apparatus according to claim 1, wherein the control section is configured such that, when a copy of the page image of the page contained in the document file is selected as the additional page, the control section sets an aspect ratio of the additional page based on an aspect ratio of the page contained in the document file, and when a captured image is selected as the additional page, the control section sets an aspect ratio of the additional page based on an aspect ratio of the externally input captured image.

3. The display apparatus according to claim 1, wherein the control section is configured to draw a drawing line on the additional page according to a trajectory of a pointed position received by the touch screen, and when the additional page is a blank page, draws the drawing line having transparency on the additional page, and when the additional page is a captured image, draws the drawing line not having transparency on the additional page.

4. The display apparatus according to claim 1, wherein the control section is configured to display the page image of the additional page anterior or posterior to the page selected by the operation received by the touch screen.

5. The display apparatus according to claim 1, wherein the control section is configured such that when displaying the bundle of images containing the reduced image of the page image of the additional page in the first display area, the control section does not attach a page number to the reduced image of the page image of the additional page.

6. The display apparatus according to claim 1, wherein the control section is configured to display a first operation image for receiving an operation to select the blank page, a second operation image for receiving an operation to select the copy of the page image of the page contained in the document file, and a third operation image for receiving an operation to select the externally input captured image, and determines which of the first operation image, the second operation image, and the third operation image is operated, and determines which of the blank page, the copy of the page image of the page contained in the document file, and the externally input captured image to add as the additional page, and the first operation image, the second operation image, and the third operation image are arranged along a first virtual axis, rotated around a second virtual axis crossing the first virtual axis, and deformed to be viewed overhead from diagonally above the first operation image, the second operation image, and the third operation image.

7. A display apparatus comprising:

a touch screen configured to receive user-initiated touch operations;

a display section; and a control section configured to control the display section to display a display window on the touch screen, the display window including a first display area for displaying a bundle of reduced images of respective pages contained in a document file and a second display area for displaying a page image of part of the pages contained in the document file, wherein the control section is further configured such that when an instruction to add a page is received by the touch screen while the touch screen is displaying the display window, the control section:

generates a reduced page image formed by reduction of a page image of an additional page not previously contained within the document file, such that the page image is displayed, superimposes and displays the reduced page image on a page image of a page selected by the operation received by the touch screen in the second display area, and displays the reduced page image of the additional page in the first display area, wherein the control section is further configured such that the instruction to add a page represents a selection of a blank page, a copy of the page image of the page contained in the document file, or an externally input captured image as the additional page, the control section is further configured such that when the touch screen receives a selection of the additional page with the drawing line drawn thereon as the additional page, and the control section displays the additional page received by the touch screen in the second display area and displays the bundle of reduced images containing the reduced image of the page image of the additional page in the first display area.

8. A control method for a display apparatus comprising:

controlling a display section to display a display window including a first display area for displaying a bundle of reduced images of respective pages contained in a document file and a second display area for displaying a page image of part of the pages contained in the document file;

when receiving an instruction to add a page while the display window is being displayed, displaying a page image of an additional page in the second display area; and displaying a reduced image of the additional page in the bundle of reduced images in the first display area, wherein it is further controlled such that the instruction to add a page represents a selection of a blank page, a copy of the page image of the page contained in the document file, or an externally input captured image as the additional page, it is further controlled such that when the touch screen receives a selection of the additional page with the drawing line drawn thereon as the additional page, and the additional page received by the touch screen is displayed in the second display area and the bundle of reduced images containing the reduced image of the page image of the additional page is displayed in the first display area.

9. A non-transitory computer-readable storage medium storing a program for controlling a computer to execute:

a procedure of controlling a display section to display a display window including a first display area for displaying a bundle of reduced images of respective pages contained in a document file and a second display area for displaying a page image of part of the pages contained in the document file;

a procedure of, when receiving an instruction to add a page while the display window is being displayed, displaying a page image of an additional page in the second display area; and a procedure of displaying a reduced image of the additional page in the bundle of reduced images in the first display area, wherein it is further controlled such that the instruction to add a page represents a selection of a blank page, a copy of the page image of the page contained in the document file, or an externally input captured image as the additional page, it is further controlled such that when the touch screen receives a selection of the additional page with the drawing line drawn thereon as the additional page, and the additional page received by the touch screen is displayed in the second display area and the bundle of reduced images containing the reduced image of the page image of the additional page is displayed in the first display area.

\*   \*   \*   \*   \*